US010032270B2

(12) United States Patent
Turner

(10) Patent No.: US 10,032,270 B2
(45) Date of Patent: Jul. 24, 2018

(54) SYSTEM AND METHODS FOR THE IN VITRO DETECTION OF PARTICLES AND SOLUBLE CHEMICAL ENTITIES IN BODY FLUIDS

(71) Applicant: Richard H. Turner, Mercer Island, WA (US)

(72) Inventor: Richard H. Turner, Mercer Island, WA (US)

(*) Notice: Subject to any disclaimer, the term of this patent is extended or adjusted under 35 U.S.C. 154(b) by 0 days.

(21) Appl. No.: 14/776,555

(22) PCT Filed: Mar. 10, 2014

(86) PCT No.: PCT/IB2014/059581
§ 371 (c)(1),
(2) Date: Sep. 14, 2015

(87) PCT Pub. No.: WO2014/141034
PCT Pub. Date: Sep. 18, 2014

(65) Prior Publication Data
US 2016/0042507 A1    Feb. 11, 2016

Related U.S. Application Data

(60) Provisional application No. 61/790,764, filed on Mar. 15, 2013.

(51) Int. Cl.
*G06K 9/00* (2006.01)
*G06T 7/00* (2017.01)
(Continued)

(52) U.S. Cl.
CPC ........... *G06T 7/0012* (2013.01); *B01L 3/50* (2013.01); *G02B 21/088* (2013.01); *G06T 7/33* (2017.01);
(Continued)

(58) Field of Classification Search
None
See application file for complete search history.

(56) References Cited

U.S. PATENT DOCUMENTS

| 4,592,089 A | 5/1986 | Hartman |
| 5,134,662 A | 7/1992 | Bacus et al. |

(Continued)

FOREIGN PATENT DOCUMENTS

| DE | 102005052752 A1 | 5/2007 |
| EP | 2239613 A1 | 10/2010 |

(Continued)

OTHER PUBLICATIONS

Taylor et al, Basic fluorescence microscop, .Methods Cell Biol. 1989;29:207-37.*

(Continued)

*Primary Examiner* — Andrae S Allison
(74) *Attorney, Agent, or Firm* — Morrison & Foerster LLP

(57) ABSTRACT

A system and methods for detecting particles and soluble chemical entities in body fluids consists of a system consisting of a microscopic apparatus, a sample chamber and reagents and methods used to detect, classify and enumerate particles and chemical entities in body fluids. Body fluids containing particles combined with reagents sediment to the bottom of a viewing chamber bringing them into the focal place of a digital microscopic detector. Particles identified as areas within a captured digital image that absorb or emit electromagnetic radiation can be further classified based on additional absorbed or emitted electromagnetic radiation within the predefined areas of the first digital image. Soluble chemical entities in body fluids are detected and concentrations determined using transmitted or emitted electromagnetic radiation using known chemical or antibody reactions, (Continued)

making the microscopic device a general purpose detector for in vitro determinations using body fluids.

16 Claims, 8 Drawing Sheets

(51) Int. Cl.
    *G02B 21/08*     (2006.01)
    *G06T 7/33*     (2017.01)
    *G06T 7/73*     (2017.01)
    *B01L 3/00*     (2006.01)

(52) U.S. Cl.
    CPC ...... *G06T 7/73* (2017.01); *G06T 2207/10056* (2013.01); *G06T 2207/10152* (2013.01); *G06T 2207/30024* (2013.01)

(56) References Cited

U.S. PATENT DOCUMENTS

| | | | | |
|---|---|---|---|---|
| 5,287,272 | A * | 2/1994 | Rutenberg | G01N 15/1468 128/925 |
| 8,040,494 | B2 | 10/2011 | Ermantraut et al. | |
| 9,837,746 | B2 * | 12/2017 | Damiano, Jr. | H01R 12/79 |
| 2002/0090120 | A1 * | 7/2002 | Wetzel | G06K 9/00127 382/128 |
| 2006/0066850 | A1 | 3/2006 | Kimura | |
| 2008/0135778 | A1 * | 6/2008 | Liu | H01J 37/20 250/440.11 |
| 2008/0239720 | A1 * | 10/2008 | Tang | G02B 21/06 362/249.07 |
| 2009/0176271 | A1 * | 7/2009 | Durack | C12N 5/0612 435/40.5 |
| 2011/0177548 | A1 | 7/2011 | Graham et al. | |
| 2011/0234757 | A1 * | 9/2011 | Zheng | G02B 21/36 348/46 |
| 2012/0098950 | A1 * | 4/2012 | Zheng | G02B 21/06 348/79 |
| 2014/0267672 | A1 * | 9/2014 | Morrison | G01N 21/6458 348/79 |
| 2015/0230698 | A1 * | 8/2015 | Cline | A61B 1/043 600/109 |

FOREIGN PATENT DOCUMENTS

| | | |
|---|---|---|
| EP | 2402813 A2 | 1/2012 |
| JP | 5-501151 A | 3/1993 |
| JP | 2003-75725 A | 3/2003 |
| JP | 2006-98227 A | 4/2006 |
| JP | 2006-238802 A | 9/2006 |
| JP | 2010-517046 A | 5/2010 |
| JP | 2012-14078 A | 1/2012 |
| JP | 2013-27392 A | 2/2013 |
| WO | 1990/010276 A1 | 9/1990 |
| WO | 1993/22058 A1 | 11/1993 |
| WO | 1997/43732 A1 | 11/1997 |
| WO | 2001/094528 A2 | 12/2001 |
| WO | 2006/124456 A2 | 11/2006 |
| WO | 2008/092075 A2 | 7/2008 |
| WO | 2009/013321 A2 | 1/2009 |
| WO | 2011/144212 A1 | 11/2011 |

OTHER PUBLICATIONS

International Preliminary Report on Patentability received for for PCT Patent Application No. PCT/IB2014/059581, dated Nov. 12, 2015, 11 pages.
International Search Report and Written Opinion received for PCT Patent Application No. PCT/IB2014/059581, dated Mar. 27, 2015, 14 pages.
Partial European Search Report received for European Patent Application No. 14765063.4, dated Jan. 18, 2017, 7 pages.
Office Action received for Japanese Patent Application No. 2015-562467, dated Dec. 18, 2017, 14 pages (8 pages of English Translation and 6 pages of Official Copy).
Extended European Search Report includes (Supplementary European Search Report and European Search Opinion) received for European Patent Application No. 14765063.4, dated May 17, 2017, 17 pages.
Lin et al., "Novel Flow Cytometrer Utilizing Wavelength-Resovled Detection under a Diascopic Illumination Configuration", Sensors, IEEE, 2010, pp. 1987-1990.

* cited by examiner

SYSTEM AND METHODS FOR THE IN VITRO DETECTION OF PARTICLES AND SOLUBLE CHEMICAL ENTITIES IN BODY FLUIDS

CROSS REFERENCE TO RELATED APPLICATIONS

This application is a U.S. National Stage patent application of PCT/IB2014/059581, filed on Mar. 10, 2014, which claims the benefit of U.S. Provisional Application No. 61/790,764, filed on Mar. 15, 2013, the entire contents of which are incorporated herein by reference.

FIELD OF THE INVENTION

The present invention generally relates to the in vitro detection of particles and chemical entities in body fluids. Specifically, the present invention relates to systems and methods that (1) identify, classify and count particles in body fluids and/or (2) determine the concentration of soluble chemical entities in body fluid samples.

BACKGROUND OF THE INVENTION

In vitro medical diagnostic tests are widely used to detect abnormalities in body fluids as an aid in diagnosing disease. Much of this testing occurs in hospital laboratories or reference laboratories that process a large number of body fluid samples in complex, highly automated, expensive instruments that require routine costly maintenance and require highly skilled operators to perform and interpret the tests and insure that the instruments are operating properly.

Since laboratory systems are large and complex, they cannot be used by individuals at home, in most doctors' offices or even in outpatient clinics or emergency rooms. There is a need for testing in these settings to reduce the need of transporting samples to remote laboratories and providing more immediate answers that can alter patient behavior or physician interventions and treatment on a timely basis.

To meet the need for such point of care testing, several systems have already been developed. Most notable are the widespread use of glucose test meters for monitoring blood glucose levels as an aid in controlling insulin use and altering dietary habits of diabetics. Dry chemistry test strips without an instrument have been used for detecting abnormalities in urine (urinalysis), bleeding of the bowel using stool samples and pregnancy using urine test strips. Diagnostic manufacturers have developed some systems for detecting cells in blood and urine that are less complex than the central laboratory equivalents but these systems are still quite costly and complex to operate and so do not fulfill the need for a true point of care device for hematology. Point of care systems for immunoassays using instrumentation have been largely unsuccessful to date.

Notably, there is no single instrument or technology that can perform the broad range of tests typically performed in a hospital laboratory since laboratory analyzers use widely different technologies to achieve the demanding requirements of sensitivity and accuracy that these types of assays require. It would be highly desirable to have an instrument that can perform a broad range of tests since users would only need to purchase one instrument. This would not only reduce the initial investment but would also reduce the complexity of operating and maintaining many different devices.

Until recently design of a point of care microscope using digital imaging has been impractical. Digital imaging of microscopic samples has been done for some time in research laboratories. Until recently sensors used in these systems were expensive. Also, until recently sensors had a limited number of pixels making resolution of microscopic digital images of poor quality and only permitting a small field of view. This limitation often made it difficult to accurately identify and classify body fluid particles and at the same time view a large enough volume to provide accurate counting statistics. Also, until recently irradiation sources for sensors used in microscopy were both expensive, difficult to maintain and difficult to use in a simple design.

The past ten years has witnessed dramatic improvements in CMOS and CCD technology that has dramatically reduced the price and improved the resolution of imaging sensors. There has also been a revolution in electromagnetic irradiation sources (most notably LED technology) that makes it possible to irradiate microscopic samples for transmission, scattering, fluorescence and phosphorescence. These technological advances now permit the design of systems that employ these components in novel ways to achieve digital microscopy that is inexpensive, high quality and versatile. With the use of CMOS sensors that have response to irradiation and sensitivity comparable to detectors used in central laboratory systems, it is possible to use a digital microscope using CMOS sensors to perform chemistry and immunoassay tests with characteristics similar to hospital laboratory systems.

Existing hospital laboratory instruments also have deficiencies in spite of their cost and complexity. For example, in laboratory flow cytometers used for hematology and urinalysis, the assumption is that particles flowing past the detector are widely separated from interfering particles so that any signals derived comes from a single particle without background interference. This leads, for example, to errors in identification and classification of red and white blood cells when amorphic crystals are present in urine samples analyzed with Sysmex analyzers. All laboratory cytometers using flow analysis (flow cytometers) must use expensive laser light sources to achieve the irradiation intensities required to detect a signal from a single cell passing the source at high speed even when highly sensitive and expensive photomultiplier detectors are used. This approach requires irradiation, irradiation detection components and complex fluidic control that are both expensive and require operation and maintenance by highly trained personnel. The present invention overcomes all of these limitations in particle identification, classification and counting at a lower cost and with less complexity.

Immunoassays usually require complex instruments that coordinate multiple reaction steps to achieve the high sensitivity and specificity required by many immunoassays. Typically, immunoassays require a separation step. This step in particular requires complex mechanical and fluid handling operations that make a low cost analyzer impractical. The present invention eliminates the need for washing and so makes immunoassays using the detection approach described in this invention of reduced cost and complexity—characteristics desirable in a point of care device.

SUMMARY OF THE INVENTION

The present disclosure relates to a microscopic method of classifying two-dimensional objects within a field of view, a measuring apparatus, and a sample chamber for the measuring apparatus. Further, a method of performing immunoassays and method of performing assays of a desired chemical entity are disclosed.

The present disclosure relates to an in vitro diagnostic test system and methods to perform hematology, chemistry, urinalysis and tests similar to immunoassays using body fluids. The invention may use any computer that has a wired or wireless connectivity, such as a USB port or Bluetooth connection ability respectively to communicate with a separate microscopic measuring apparatus. The invention may use a computer embedded in the measuring apparatus.

The computer may be as complex as a desktop computer or as simple as a tablet, such as an iPad mini or Samsung Galaxy. It contains application software that allows the user to identify samples, select tests to perform and initiate the testing sequence. It transmits high level signal to the microscopic apparatus wirelessly using Bluetooth or hard-wired through a USB connection. Alternatively, a computer may be embedded in the measuring apparatus.

A microscopic method of classifying particles as two-dimensional objects within a field of view is disclosed. The method may comprise irradiating the field of view with a first electromagnetic radiation source and projecting the resulting image (first image) onto an image sensor to obtain a first digital representation of the field of view. The method may comprise using the first digital representation to identify first objects within the first digital representation and using edge coordinates of the edges of the first objects to define the areas contained within the first digital representation of the first objects to circumscribe the areas of the first objects followed by determining one or more object properties of the first objects. Optionally, the method comprises separating particles that are touching by subtracting one pixel from the border for the first digital representation of the first objects. The method may comprise using the edge coordinates or at least some of the edge coordinates to define an area adjacent to the edge of a first object but outside of the first object to calculate a background intensity of the first electromagnetic radiation source and compensate for the background intensity, e.g. by subtracting this average background intensity from the electromagnetic intensity of the first object. The method may comprise using the electromagnetic intensity of the areas within the edges of the first objects (first image) to determine particle properties within the first objects that absorb light by reference to a standard curve or other reference curve.

Also disclosed is a microscopic measuring apparatus comprising an image sensor, an objective lens, and one or more electromagnetic radiation sources including a first electromagnetic radiation source for irradiating a microscopic stage and/or a second electromagnetic radiation source for irradiating a microscopic stage. The image sensor is wired or wirelessly connectable to a separate computer configured to identify and classify objects in images collected from the image sensor in the microscopic apparatus.

Further, a sample chamber for use with a microscopic measuring apparatus is disclosed, the sample chamber comprising two flat surfaces separated by 5 and 50 microns for containing a sample, the sample chamber configured to contain between 5 and 100 uL of fluid, the shape of the sample chamber permitting uniform and reproducible filling of the sample chamber with sample and preventing movement of the sample or evaporation of sample prior to completing analysis.

A method of performing immunoassays is disclosed, the method using a microscopic measuring apparatus comprising an image sensor, an objective lens, an optional optical filter assembly for modifying light properties of irradiating, emitting or scattered radiation and/or to direct transmitted, scattered electromagnetic radiation and emitted electromagnetic radiation, at least one electromagnetic radiation source that can be switched on and off, and the microscopic measuring apparatus configured for wired or wireless communication with a separate computer containing imaging software and is configured to identify and classify objects in images collected from the image sensor in the microscopic measuring apparatus. The method comprises one or more of the following acts:

a) using specific antibodies attached to dispersed solid phase particles that sediment in aqueous solution at a rate between 0.1 mm per minute and 2 mm per minute and the antibody on the particle specifically binding analytes in whole blood b) detecting the analytes attached to antibody bound solid phase either competitively using a labeled analyte or non-competitively using a labeled capping antibody where the dispersed particles sediment to the bottom of a viewing chamber, the height of the viewing chamber being selected to provide enough concentration of the particles so that a washing step is not required to achieve the desired sensitivity for the assay where the images of the sedimented particles are identified by a first electromagnetic radiation and the boundary or edges of this first image object are determined, and c) determining the intensity of electromagnetic radiation lying within the boundary defined by the first electromagnetic radiation after exposure to a second electromagnetic radiation, and d) determining the intensity of electromagnetic radiation lying outside the boundary defined by the first electromagnetic radiation after exposure to a second electromagnetic radiation, and subtracting the intensity of electromagnetic radiation lying outside the boundary defined by the first electromagnetic radiation from the intensity of electromagnetic radiation lying within the boundary defined by the first electromagnetic radiation effectively subtracting background electromagnetic radiation whereby the intensity of the second electromagnetic radiation is compared to a standard curve to derive a concentration of the analyte assayed.

Further, a method of performing assays of a desired chemical entity using a binding partner for the desired chemical entity attached to a dispersible solid phase objects is disclosed, the method using a microscopic measuring apparatus comprising an image sensor, an objective lens, an optional optical filter assembly for modifying light properties of irradiating, emitting or scattered radiation and/or to direct transmitted, scattered electromagnetic radiation and emitted electromagnetic radiation, at least one electromagnetic radiation source that can be switched on and off, and the microscopic measuring apparatus configured for wired or wireless communication with a separate computer containing imaging software and is configured to identify and classify objects in images collected from the image sensor in the microscopic measuring apparatus, and control software for operating the microscope by the method of classifying two dimensional objects within a field of view. The method comprises one or more of the following acts:

a) irradiating the objects within the field of view with a first electromagnetic radiation source, b) projecting the resulting image onto an image sensor, c) using the resulting digital representation of the objects within the field of view to identify particles as objects within the digital representation using ImageJ software, d) using the coordinates of the edges of each object to define the area contained within the digital representation of the objects to circumscribe the area of each object,
e) determining the area, diameter and average intensity of the digital representations of each object,
f) separating particles that are touching by subtracting one or more pixels from the border for the digital representation of the object so that touching particles can be identified, enumerated and properly classified,
g) using the edge coordinates to define an area adjacent to the edge of the object but outside of the object to calculate a background intensity of the electromagnetic source and subtracting this average background intensity from the electromagnetic intensity of the object contained within the edges of digital representations of each object,
h) using the electromagnetic intensity of the area within the edges of the object to determine the concentration of the chemical entity within the object that absorbs light by reference to a standard curve,
i) interrogating the same first objects sequentially with as many electromagnetic sources as required to provide unique optical information about the objects within the predetermined boundary of the digital representation of the objects as required to further classify the first set of objects into subsets, and
j) interrogating the same field of view with n additional first electromagnetic radiation sources, each electromagnetic source differentiated by some electromagnetic property that uniquely distinguishes objects within the field of view based on electromagnetic properties of the objects and then exposing the objects with as many additional electromagnetic radiation sources to sub classify objects contained within borders identified by first irradiation sources,
k) using any binding partner attached to a dispersed solid phase to capture a desired chemical entity in body fluids and detects the desired chemical entity either competitively using a second labeled capture partner of the chemical entity or non-competitively using a labeled derivative of the desired chemical entity
l) where the dispersed particles sediment to the bottom of a viewing chamber, the height of the viewing chamber selected to provide enough concentration of the particles so that a washing step is not required to achieve the desired sensitivity for the assay;
m) where the images of the sedimented particles are identified by a first electromagnetic radiation and the boundary or edges of this first image object are determined;
n) and after exposure to a second electromagnetic radiation, the intensity of electromagnetic radiation lying within the boundary defined by the first electromagnetic radiation is determined;
o) and after exposure to a second electromagnetic radiation, the intensity of electromagnetic radiation lying outside the boundary defined by the first electromagnetic radiation is determined and subtracted from the intensity of electromagnetic radiation lying within the boundary defined by the first electromagnetic radiation is determined; and
p) comparing the intensity of the second electromagnetic radiation to a standard curve to derive a concentration of the assayed nucleic acid.

The microscopic apparatus is similar in width and height to an iPad but several inches thick though larger versions may be useful in certain applications The design of the apparatus is simple in concept and low cost to manufacture and operate.

The microscope apparatus detects particles such as white or red blood cells in body fluids using microscopic detection. To accomplish this, the apparatus has arrays that irradiate the sample sequentially with irradiation of various wavelengths, directions and properties. The sample absorbs, scatters and may re-emit electromagnetic irradiation that is magnified by an objective lens and projected onto a CMOS or CCD sensor.

Digital images from the sensor are transmitted to the computer where image processing software identifies, classifies and enumerates objects in the images.

A unique feature of this invention is the concept of obtaining multiple images of a field of view using different irradiation means of objects while the field of view remains static. By obtaining multiple images of fields of view using different irradiation means it eventually becomes possible to correctly identify and classify objects.

Another feature of this invention is that a first digital image using one source of electromagnetic irradiation is used to identify object coordinates and boundaries based on one irradiation property of each object within this image and then capturing one or more additional images using different electromagnetic irradiation. By having a means of registering each image to the first one, it is possible to verify that the properties of each digital image are properties of the first object. In usual microscopy based on a single image, background signals can be misinterpreted as belonging to an object.

DETAILED DESCRIPTION OF THE INVENTION

Figure 1:
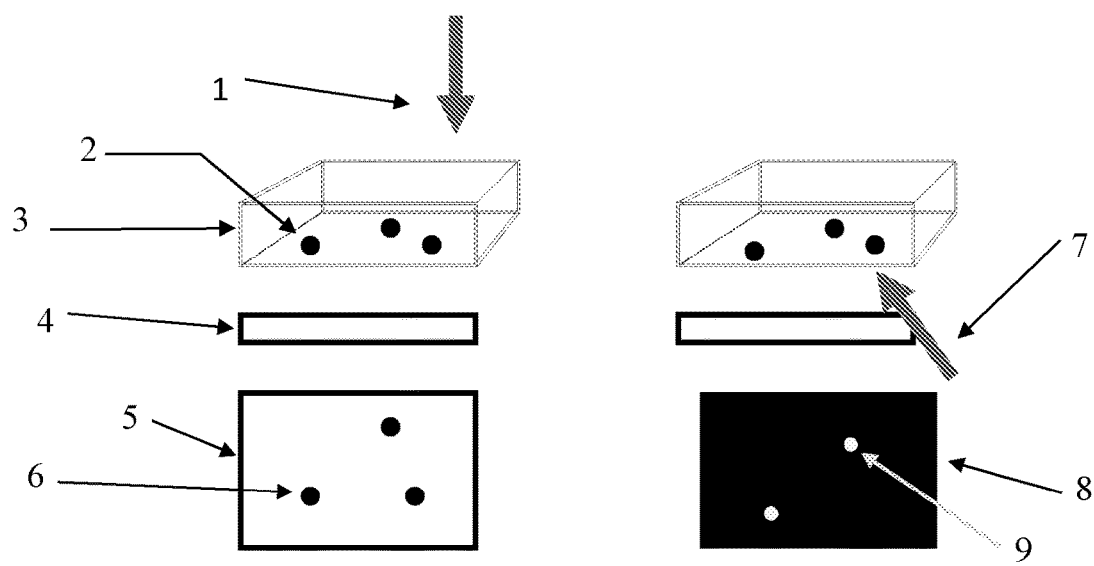
FIG. 1 illustrates an example of digital images created by irradiating objects in a sample that sediment to the bottom of a sample chamber with a first electromagnetic radiation followed by a second electromagnetic irradiation.

In the following description of the invention reference is made to the description of the drawings which form a part thereof, and in which is shown, by way of illustration, exemplary embodiments illustrating the principles of the invention and how it may be practiced. It is to be understood that other embodiments may be utilized to practice the invention and structural and functional changes may be made thereto without departing from the scope of the present invention. Further, features described in relation to a figure are not necessarily limited to the specific combination of features disclosed in the figure.

The method may comprise interrogating the first objects sequentially with as many electromagnetic radiation sources as required, e.g. at least two, three or more, to provide unique optical information about the first objects within the predetermined boundary of the first digital representation of the first objects as required to further classify the first objects into first subsets.

The method may comprise interrogating the field of view with a second electromagnetic radiation source to obtain a second digital representation of the field of view, the second electromagnetic radiation source differentiated from the first electromagnetic radiation source by some electromagnetic property that uniquely distinguishes second objects within the field of view based on electromagnetic properties of the second objects. The method may then comprise exposing the second objects with as many additional electromagnetic radiation sources as required to provide unique optical information about the second objects of the second digital representation as required to further classify the second objects into second subsets to sub-classify objects contained within borders identified by first electromagnetic radiation sources.

The electromagnetic radiation sources may be configured to radiate or radiate light of wavelengths selected from the range of 100 nm to 2000 nm. The light may include portions of the ultraviolet, visible and/or infrared spectrum.

The electromagnetic radiation sources may be configured to radiate or radiate light of wavelengths selected from the range of 100 nm to 000 nm. The light may cause fluorescent excitation of naturally occurring fluorophores and/or artificially introduced fluorophores. The light emitted by the excited fluorophores may be used to create images that aid in classifying the corresponding object.

The electromagnetic sources may be configured to radiate or radiate light of wavelengths selected from the range of 100 nm to 2000 nm. The light may be absorbed by chemical entities or particles within the object so that the corresponding image containing the absorbing entities or particles has a lower intensity of detected electromagnetic radiation.

The method may comprise using electromagnetic radiation sources that intersect the sample at different angles to cause different intensity of electromagnetic radiation scattering of objects within the field of view.

The method may comprise using one or more electromagnetic sources, e.g. first electromagnetic source and/or second electromagnetic source, that intersect objects within the field of view from 0 to 80 degrees normal to the detecting sensor area so that the objective lens of the microscope captures light scattered at different angles, such as a first angle for a first electromagnetic source and/or a second angle for a second electromagnetic source. The first and second angles may be different.

The method may comprise using electromagnetic sources with the same or different polarization properties, such as a first electromagnetic source with first polarization properties and a second electromagnetic source with second polarization properties.

The method may comprise using electromagnetic sources that induce phosphorescence of naturally occurring phosphors and/or artificially introduced phosphors.

The method may comprise using transmitted light source from the Soret band of hemoglobin to create images of erythrocytes from animal or human body fluids such as blood. The method may comprise using these images to calculate particle properties, such as the area, the diameter and the volume, of the erythrocyte and/or the concentration of hemoglobin within the erythrocytes. Reticulocytes may be identified among all of the erythrocytes by exciting a fluorophore, e.g. a nucleic acid binding fluorophore, attached to the reticulin in reticulocytes. The method may comprise identifying those erythrocytes that have fluorescent emissions.

The method may comprise treating leukocytes from animal or human body fluids such as blood with fluorophores. The method may comprise detecting leukocytes, e.g. by using an excitation light source. The emitted light may be is projected onto a detection sensor to form digital representations of the fluorescing leukocytes. The method may comprise using nucleic acid bound fluorophores for the detection of leukocytes from animal and/or human blood. The nucleic acid bound fluorphores may be selected from the group of acridinium esters, thiazole orange and ethidium bromide.

The method may comprise calculating the properties of the object, e.g. one or more of diameter, concentration of the fluorescently emitting entity and the volume of the object corresponding to the two-dimensional fluorescent image. The method may comprise using the one or more properties, e.g. the diameter, concentration of the fluorescently emitting entity and/or the volume of the object to aid classify the leukocytes into lymphocytes, granulocytes and monocytes.

The method may comprise using two or more fluorescent excitation sources or two or more fluorescent emission detection wavelengths to detect different fluorescing species so that different entities within a leukocyte can be detected. The method may comprise using the intensity and the amount of fluorescence to further classify subsets of leukocytes.

The method may comprise using visible light from 300 nm to 800 nm that illuminates granulocytes at angles between 60 and 90 degrees normal to the sensor, e.g. so that cytoplasmic granules in white cells intensely scatter light while cytoplasm without granules scatter no light or scatter light of very low intensity.

In the method, leukocytes from human or animal body fluids such as blood may be identified first using fluorescence (first image) and then identifying lymphocytes and monocytes as the images (second image) with negligible scattered light.

The method may comprise using a 1 to 50 megapixel image sensor, such as a CMOS or CCD sensor.

The electromagnetic sources may be switched on and off with electronic switches providing the ability of interrogating the same field of view sequentially with 2-10 different electromagnetic sources limited only by constraints of space for the electromagnetic sources and constraints in time for imaging the field of view.

The method may comprise having a disposable or reusable viewing or sample chamber that contains a liquid dispersion of particles of interest and permits a statistically significant number of particles to be counted. The viewing or sample chamber may have a thickness between 50 microns and 10 mm.

The method may comprise placing an objective lens between the detecting CMOS or CCD sensor, the objective lens providing sufficient magnification to determine object dimensions and yet has a sufficient field of view to permit statistically significant counting of objects in the field of view. The objective lens may have a magnification between 2× and 15×.

The method may comprise detecting both erythrocytes and leukocytes in body fluids without separation an/or lysis of the red cells using the Soret band of erythrocytes to identify erythrocytes and the fluorescence of nucleic acid bound fluorophores to detect leukocytes.

The method may use a sphering reagent such as but not limited to N-Dodecyl-N,N-dimethyl-3-ammonio-1-propanesulfonate to convert erythrocytes from biconcave discs to uniform spheres. The sphering reagent may not affect the morphology or scattering properties of leukocytes.

The method may use a reagent that maintains the native biconcave disc shape of the erythrocytes.

The method may comprise selectively lysing red cells within 30 seconds to 10 minutes without affecting the morphology or light scattering properties of leukocytes.

The method may use ammonium chloride, such as 0.1 M ammonium chloride, pH 8.0, as the red cell lysing reagent with or without sphering reagents.

The microscopic measuring apparatus is used to detect particles or high or low molecular weight chemical entities in body fluids. The body fluids may include but are not limited to, blood, urine, spinal fluids, saliva, peritoneal fluids and lung lavages and providing a complete range of in vitro diagnostic tests using a single measuring apparatus.

The microscopic measuring apparatus may be configured to perform one or more or hematology, urinalysis, chemistry, immunoassay and/or coagulation in vitro diagnostic tests.

The microscopic measuring apparatus may comprise an optical filter assembly including at least one of a first optical filter, a first mirror and a first beam splitter, the first optical filter configured to modify light properties of irradiating, emitting or scattered radiation, the first mirrors and/or the first beam splitter configured to direct transmitted, scattered electromagnetic radiation and emitted electromagnetic radiation.

The optical assembly may be configured to redirect the light from the objective lens from a vertical plane to a horizontal plan so that the height of the camera is between 2 cm and 15 cm.

The microscopic measuring apparatus may comprise a light source, such as a light ring, placed below the microscopic stage. The light source may be configured for front surface epi-illumination.

The microscopic measuring apparatus may be configured to provide front surface epi-illumination through the objective lens.

The microscopic measuring apparatus may be configured to perform fluorescent microscopy. The microscopic measuring apparatus may be configured to perform transmission microscopy. The microscopic measuring apparatus may be configured to perform light scattering microscopy.

The microscopic measuring apparatus may comprise a plurality of electromagnetic radiation sources. The microscopic measuring apparatus may be configured to sequentially perform transmission, light scattering and/or fluorescence microscopy on the same set of objects by sequentially illuminating the objects in the microscopic stage with different electromagnetic radiation sources.

The microscopic measuring apparatus may be configured to provide illumination between 0 and 60 degrees perpendicular to the path of scattered light path through the objective, e.g. with the first electromagnetic radiation source.

The microscopic measuring apparatus may be configured to provide illumination from 60 to 80 degrees perpendicular to the path of scattered light path through the objective, e.g. with the first electromagnetic radiation source and/or with a second electromagnetic radiation source.

The microscopic measuring apparatus may comprise one or multiple LEDs (light emitting diodes) arranged between the stage and the objective lens. The microscopic measuring apparatus may be configured to illuminate a sample in the microscopic stage with transmitted light. The microscopic measuring apparatus may be configured to control an illumination time of a fluorescent excitation source between 20 milliseconds and 10 seconds, e.g. to achieve sufficient fluorescent emission intensity for the image sensor to detect objects of interest with fluorescent emissions.

The microscopic measuring apparatus may be configured to control the illumination time of LEDs placed from 0 to 80 degrees perpendicular to the path of scattered light path through the objective between 20 milliseconds and 10 seconds, e.g. to achieve sufficient light scattering to detect objects of interest.

The microscopic measuring apparatus may be configured to use emitted electromagnetic radiation specific for a chemical reaction of interest.

The microscopic measuring apparatus may be configured to use dry chemistry test strips mounted on a moveable stage to perform chemical analyses, the area of detection determined by calculating the area of the dry reaction pad that provides consistent readings.

The microscopic stage may be fixed or moveable and configured for holding a sample chamber positioned in front of the objective lens while illuminated by the electromagnetic radiation sources. The microscopic stage may be moveable and configured to permit one to ten viewing areas to be viewed through the objective in the sample chamber. The stage may be moveable either manually and/or under motor control. The microscopic stage may be configured to hold the sample chamber a fixed distance, such as +/−10 microns, between the imaging surface of the image sensor and the surface on which objects are resting, e.g to obviate the need for focusing before taking images.

The microscopic stage may contain a fixed reference area that permits the microscopic measuring apparatus to adjust illumination intensity of the electromagnetic radiation sources and/or verify ranges of intensity used to aid in classifying objects in a sample. The fixed reference area may permit quality control of magnification and focus of the microscopic measuring apparatus without operator intervention.

The sample chamber may comprise a chamber used to combine a sample with a reagent. The sample chamber may comprise means for accurately measuring a sample portion, e.g. 5-50 uL of sample, and a reagent portion, e.g. 50 to 500 uL of reagent, and then combining and mixing the sample with the reagent prior to introducing the sample into an observation area of the sample chamber.

The sample chamber may have a first wall and a second wall with two respective flat surfaces. The first wall and/or the second wall may be between 100 microns and 4 mm in thickness. The thickness and/or composition of the respective walls are selected to minimize or reduce spectral reflections and/or light scattering from the surfaces into the chamber that might otherwise contribute to background scattering. The sample chamber may have a viewing area of 1 mm by 1 mm up to 5 mm by 5 mm. The sample chamber may have a height from 100 microns to 20 mm. The sample chamber may be configured to permit samples to sediment from 60 seconds up to 24 hours, e.g. so that particles that sediment come to rest at the bottom of the sample chamber and can be viewed, identified and classified by the microscopic measuring apparatus.

The sample chamber may comprise a closure for closing the sample chamber after filling the sample chamber, e.g. so that evaporation is reduced or no evaporation occurs during settling time.

The present invention may be embodied in a system comprising one or more of the elements depicted in FIGS. 1, 2, 3, 4, 5 and 6 and described in the following specification.

FIG. 1 illustrates an irradiation source 1, irradiating a sample chamber 3 containing particles or objects 2. The microscopic apparatus 12 (FIG. 2) switches on irradiating source 1. Irradiating source 1 irradiates sample chamber 3 and the irradiation from source 1 is absorbed by particles or objects 2 in the sample chamber 3. The resulting irradiation passes through the sample chamber and falls on a two dimensional CMOS or CCD sensor 4 positioned below the sample chamber. The CMOS or CCD sensor may be black and white or color. It must be sensitive to the irradiation source 1. Irradiating source 1 in FIG. 1 for purposes of illustration is perpendicular to the flat surface of the sample chamber and the sensor and so illustrates transmitted irradiation. Irradiating source 1 need not be restricted to transmitted irradiation.

Under firmware control from the microscopic apparatus (12 illustrated in FIG. 2) the microscopic apparatus (12 illustrated in FIG. 2) captures a digital image 5 of the transmitted irradiation. In this illustration, the particles or objects 2 in the sample chamber 3 absorb irradiation from the irradiation source 1 so that the digital image 5 has dark objects 6 (the degree of shade depending on the degree of absorption of irradiation) on an essentially white background. The digital image 5 is saved in firmware memory on the microscopic apparatus and later transferred to a computer 10 (FIG. 2) for further image processing, results calculation and reporting to the user of the device.

After the first image 5 has been captured and saved, the microscope apparatus 12 (FIG. 2) switches off irradiation source 1 and switches on irradiation source 7 while the sample chamber 3 remains in the same position. Irradiation source 7 should differ in some way (wavelength, position relative to the sample, degree of collimation or quality of the irradiation source such as degree of polarization) from irradiation source 1.

In the illustration shown, irradiating source 7 is a source that causes scattering of radiation. If irradiation source 7 causes objects or particles 2 in the sample chamber 3 to scatter radiation to the sensor 4, the scattered radiation is projected onto the sensor 4 and is observed in a digital image 8 as white areas 9 (the intensity of the white shading depending on the intensity of scattered radiation) on an essentially black background. FIG. 1 illustrates a case in which one of the objects in the sample chamber absorbs light and produces a dark spot on digital image 6 but does not scatter radiation and therefore does not scatter radiation to the sensor and produce a white area in digital image 8. This particle is different in this one property from the other two particles and on the basis of this difference can be accurately classified in a different class.

It is to be understood that FIG. 1 is only one possible embodiment of the invention. The first irradiating source 1 or the second irradiating source 7 may be from any angle or position surrounding the sample chamber constrained only by the ability to fully and evenly illuminate the sample chamber. Specifically, the irradiating sources may illuminate the sample chamber and objects within the chamber at an angle of 10 degrees (almost parallel to the surface of the sample chamber) up to 80 degrees perpendicular to the surface of the sample chamber. In one embodiment of the invention, 660 nm LEDS positioned to illuminate objects in the viewing chamber between 20 and 60 degrees perpendicular to the surface of the viewing chamber that is parallel to the sensor caused granulocytes in whole blood to scatter light more intensely than monocytes or lymphocytes allowing a clear classification of granulocytes as a distinct particle type.

Irradiating sources 1 and 2 may be of a range of wavelengths from 100 nm to 2000 nm. Irradiating sources 1 and 2 may be collimated to varying degrees or non-collimated or the quality of the radiation may be modified in any way such as by polarizing the light. Irradiating sources may excite fluorescent or phosphorescent molecules retained within particles or certain parts of particles that emit radiation projected onto the sensor 4. The invention is not limited to the number of irradiation sources that may be switched on and off sequentially to obtain corresponding digital images with unique properties that permit identification and classification of particle types.

A feature of the present invention is the sequential irradiation of the sample chamber and objects in the sample chamber with different irradiation sources and processing corresponding digital images. The number of possible sequential irradiation sources and corresponding images is not limited by the specific example in FIG. 1. From one to 10 sequential irradiation might be used constrained only by limitations of space and cost.

Another feature of this invention is the ability to irradiate the sample chamber and objects in the sample chamber with different irradiation sources having different irradiation properties (such as but not limited to wavelength, polarization, collimation, angle of illumination etc.) by simply turning on or off irradiation sources that require a short duration time to reach stable operating conditions. Irradiation sources should be able to reach stable operating conditions in 1 millisecond to 1000 milliseconds to be practical for this device. Light emitting diodes are a specific example of such irradiating sources that provide this advantage in contrast to irradiation sources such as xenon or tungsten lamps that may require considerable time to reach stable operating conditions.

Another important feature of this invention is using the first irradiation source 1 to detect objects or particles within a viewing chamber and using the first digital image 5 to determine the coordinates, area and boundary or edge of the object. The first irradiation source 1 must provide sufficient contrast of the objects 2 to allow the use of commonly available image processing tools such as ImageJ software available from the National Institutes of Health as freeware. Such software and comparable commercial products known to those skilled in the art of digital image processing contain algorithms to convert the digital images such as 5 to a binary image that allows particle or object detection, counting, area, diameter, shape and irradiation intensity within the image. Size, intensity or shape thresholds are typically used to identify and enumerate particles and objects within the digital image that meet predefined criteria stored within the microscopic apparatus memory.

Irradiation of objects from irradiation source 7 will produce digital images like digital image 8 that are used to define object coordinates of each object in the second digital image. The coordinates of objects in digital image 5 are compared to coordinates of objects in the second digital image 8. Using rules embedded in the microscopic apparatus firmware of how far apart coordinates can be to still consider the objects to be the same, the image processing software matches objects in the second digital image 8 to images in the first digital image 5. If there is a match, the irradiation properties for objects in digital image 8 are attributed to the corresponding objects in digital image 5 having matching coordinates. This approach reduces the risk of attributing an irradiation property that may be due to interference (e.g. non-specific scatter or fluorescence or scatter or fluorescence due to a particle that has a distinct effect on irradiation source 7 while having an effect outside threshold limits imposed for objects in digital image 5).

After matching coordinates of particles in two different images, the intensity of irradiation outside the boundary of objects in digital images 5 and 8 may be averaged and subtracted as background from the intensity of irradiation within the boundary of objects to provide more accurate irradiation intensity estimates. Alternatively, a two to ten pixel boundary layer around the boundary of the object may be selected with confidence and used to make background corrections to the irradiation intensity of the object.

Figure 2:
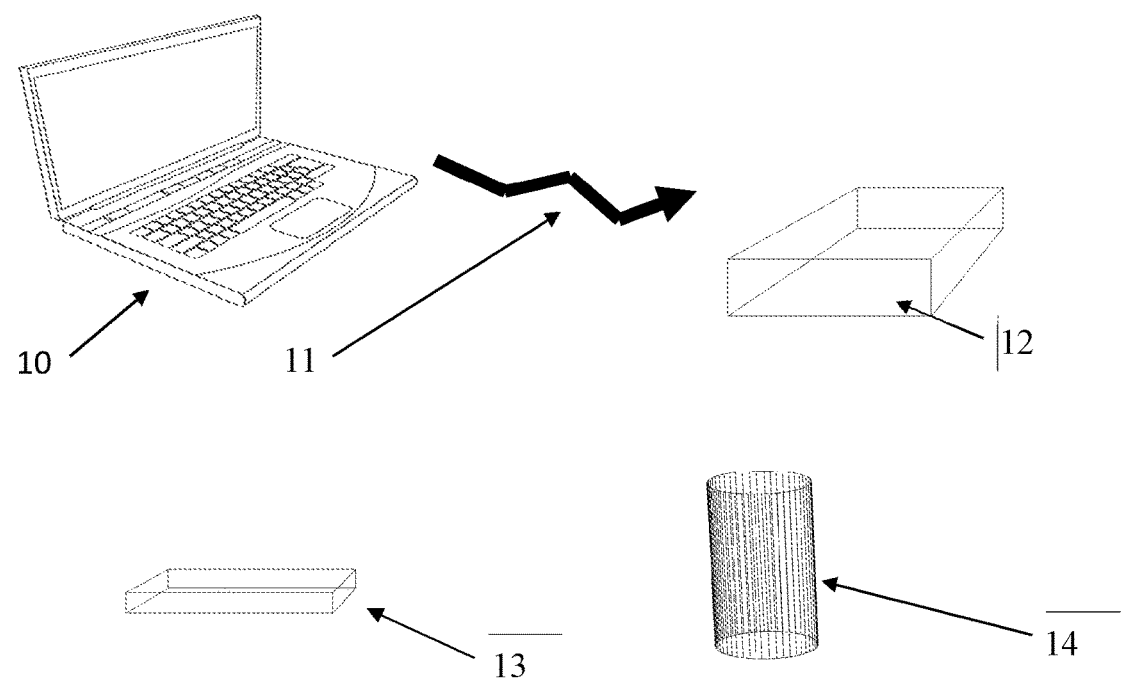
FIG. 2 illustrates a configuration of the microscopic measuring apparatus used with a computer containing an image processing application and user interface software.

Another important feature of the current invention is the ability of the microscopic apparatus 12 in FIG. 2 to control the duration of irradiation of the sample chamber. In the case of transmitted irradiation the exposure time of the sensor 4, sample chamber 3 and objects within the sample chamber 2 may vary from 1 to 200 milliseconds depending on the intensity of the irradiating source and the sensitivity of the sensor. For irradiating sources that scatter light from the objects, or cause fluorescence or phosphorescence of objects, the exposure time of the sensor 4 sample chamber 3 and objects within the sample chamber 2 may vary from 100 milliseconds to 10 seconds depending on the intensity of the irradiating source and the sensitivity of the sensor.

FIG. 2 illustrates the main components of the system. Application software resides on a computing device 10 that can be any device that has either a universal serial bus (USB) port or Bluetooth capability for communicating with the microscopic apparatus 12.

The computing device may be a desktop personal computer, a mobile computer, a tablet (such as an iPad mini or Samsung Galaxy). Bluetooth communication between the computer 10 and the microscopic apparatus 12 is illustrated in the diagram with a symbol for wireless communication 11. The components microscopic apparatus is described in more detail in FIG. 3. Body fluid samples are collected and combined with one or more reagents 14 and transferred to a sample chamber 13 that is inserted into the microscopic apparatus 12 for irradiation and image acquisition.

Figure 3:
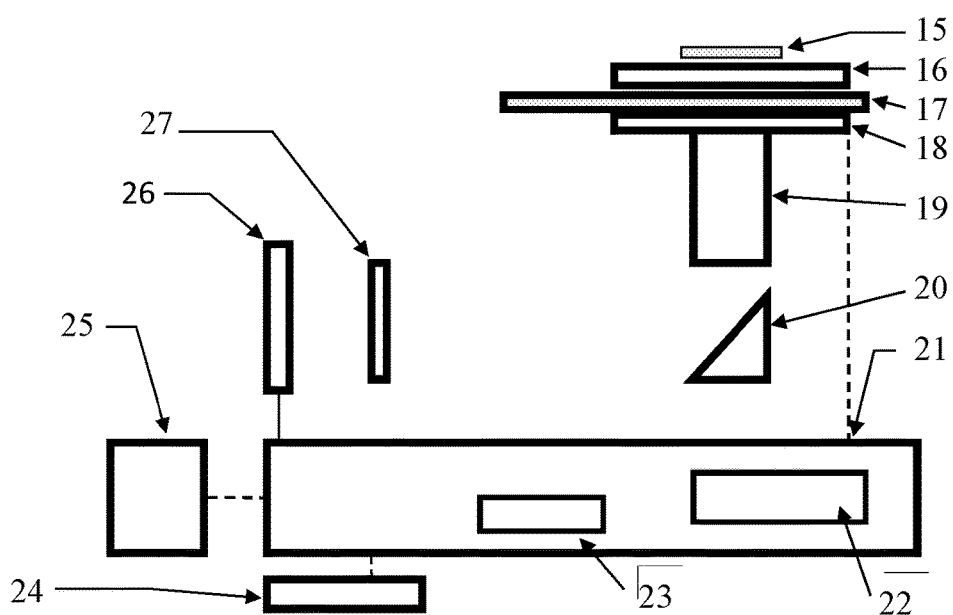
FIG. 3 illustrates a schematic view of the components of the microscopic measuring apparatus.

FIG. 3 is a schematic representation of an exemplary embodiment of the invention illustrating how components might be positioned in the microscopic apparatus. Other arrangement of the components represented in this figure or the addition of other components to those represented without departing from the scope of the invention.

An irradiation source 15 positioned above the sample chamber 16 (also illustrated in more detail in FIG. 4) provides irradiation for transmission microscopy of the beam if the irradiation is directed perpendicular to the plane of the sample chamber 16 and parallel to the plane of the sensor 26 in this illustration. Irradiation source 15 may also be an array of lights capable of irradiating the sample chamber 16 at angles of 0 to 90 degrees of the plane perpendicular to the sample chamber 16 as well. This off axis irradiation may cause forward scattering of irradiation from irradiation source 15 by particles in the sample chamber 16.

The sample chamber 16 is held in place by a microscopic stage 17. The plane of the microscopic stage 17 and sample chamber 16 is horizontal. The microscope stage 17 may be fixed. The microscope stage 17 may also be moved manually or under motor control to position various parts of the sample chamber 16 to irradiation and microscopic imaging.

Below the stage is a sub stage array of irradiation sources 18. One configuration of this irradiation array is a ring of LED lights that emit light at different wavelengths. This array irradiates the bottom face of the sample chamber 16 and particles that sediment to the bottom face of the sample chamber 16. This array 18 in some embodiments of this invention provide LED illumination that is almost at right angles to particles in the sample chamber 16 but may provide irradiation from 10 to almost 80 degrees from the bottom plane of the sample chamber 16. In one embodiment, this array (1) provides 660 nm LED illumination of particles in the sample chamber 16 causing scattering of light collected by the objective lens 19 and projected on the sensor 26 and (2) in a following sequence illuminate objects in the sample chamber with 450 nm to 500 nm LED light, exciting fluorophores within the particles causing them to emit fluorescent light of a longer wavelength of 650 nm, the emitted light collected by the microscopic objective 19 and projected onto the sensor 26.

A microscopic objective 19 is positioned below the sample chamber 16, microscope stage 17 and the sub stage array of irradiation sources 18. The microscopic objective 19 is positioned perpendicular to the plane of the microscope stage 17, sample chamber 16 and sub stage array of irradiation sources 18. The objective lens can be a 5× to 20× objective. The objective is chosen to view the maximum number of particles in a single field of view of the sample chamber 16 without sacrificing resolution or the ability to accurately determine irradiation properties from the particles. A 10× objective positioned so that particles in the sample chamber are magnified 5 times onto the CMOS or CCD sensor 26 is a good choice for many of these embodiments. For one embodiment of this invention a Nikon 10× objective (MRL00102 CFI Plan Achro 10× NA 0.25 WD 10.5 mm) was used. With a 10× objective lens 19 projects particles onto the sensor with a 5.1 fold magnification, a depth of field of about 10 to 50 microns is possible so that focusing the device is not required if the sample chamber is held rigidly in place.

Positioning objective lens 19 below the microscope stage 17 and sample chamber 16 is known to those skilled in the art as an inverted microscope stage microscope. This configuration is preferred for this invention since irradiation sources often cause background interference that is minimized in this configuration. In the inverted configuration, the irradiation does not have to pass through particle free sample or multiple faces of the sample chamber 16 before irradiating the sample. Likewise, irradiation scattered or emitted from objects does not pass through particle free solution or as many faces of the sample chamber 16 before being collected by the objective lens 19.

In one embodiment of the present invention, a right angle mirror 20 directs light from the objective lens 19 from a vertical plane to a horizontal plane through an optical filter 27 to a sensor 26. The purpose of this mirror is to make the overall height of the microscope apparatus less than two to three inches so that it can rest easily on a flat table top. The invention can also be made without the right angle mirror 20 with the optical filter 27 and sensor 26 directly below the objective lens 19.

An alternative arrangement of components than the one illustrated is to replace the right angle mirror 20 with a beam splitter that redirects the light from the objective in the vertical plane onto the sensor 26 in the horizontal plane. In this arrangement it is also possible to position an irradiation source below the beam splitter and direct the irradiation from this source through the objective lens 19 onto particles in the sample chamber 16. This arrangement has the advantage of focusing the light on the particles and less so on fluid above the particles maximizing the irradiation on the particles and minimizing irradiation on potentially interfering material in the surrounding fluid. This configuration is useful when causing fluorescence excitation using the irradiating source directed through the objective. In this configuration it is possible to add filters between the irradiation source and the beam splitter or further condition the irradiation if required.

FIG. 3 depicts an irradiation filter 27 positioned between the right angle mirror 20 (or beam splitter) and the sensor 26. The purpose of the irradiation filter 27 is to block certain wavelengths of irradiation from reaching the sensor 26.

The sensor 26 is a two dimensional array of pixels. It can be as small as 0.5 megapixels used in early embodiments up to the largest commercially available sensors of 20 or more megapixels. The largest sensor possible within the constraints of cost is optimal. Larger sensors provide either better resolution or permit viewing a larger area of the sample at the same resolution as a smaller sensor. The sensor may be a colored sensor or a black and white sensor. A black and white sensor is the preferred embodiment for most applications since the selection of wavelength of the irradiating sources provides color information and is able to do this in a much more controlled way. In addition, the use of a black and white sensor provides better resolution since all pixels are available for imaging at a given wavelength.

The microscopic apparatus in FIG. 3 can communicate with the computer 10 (FIG. 2) wirelessly using a Bluetooth card 25 or a Bluetooth dongle. The microscopic apparatus may also communicate with the computer 10 and/or receive power from the computer 10 using a universal serial bus (USB) 24. The microscopic apparatus may also be powered by batteries 23. The computer may optionally be embedded in the measuring device.

The microscopic apparatus has at least one printed circuit board with memory 23 for storing images captured from the sensor 25 and information and firmware applications required for controlling irradiation sources, communication, power and sensor and any other optional powered devices. The printed circuit board also contains a micro processor 22 that operates a microscopic apparatus specific firmware application that controls irradiation sources, communication, power and sensor and any other optional powered devices.

Figure 4:
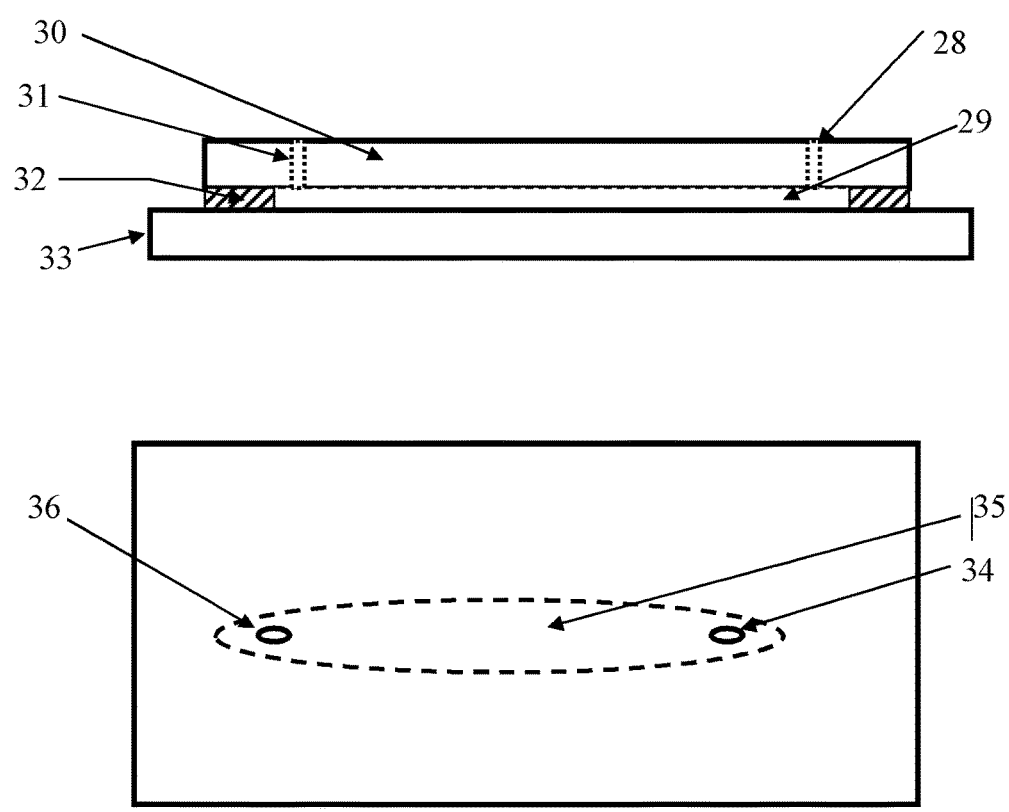
FIG. 4 illustrates a schematic of a side and top view of the sample chamber.

FIG. 4 is one embodiment of a sample chamber. The upper schematic diagram of FIG. 4 is a side view of the sample chamber. The bottom schematic is a top view of the sample chamber. The sample chamber may be disposable or re-useable.

The sample chamber has an upper optical surface 30 and a lower optical surface 33 separated by a spacer 32 to form a hollow sample well 29 that contains a liquid sample. Sample is introduced into the sample chamber through an entry port 28 with air escaping through an exit port 31.

The upper optical surface 30 and lower optical surface 33 may be constructed of optical grade acrylic, glass or any material of comparable optical quality. Both pieces should be flat and the surface ideally should not vary by more than +/−5 microns from one end or side to the other since the surfaces facing the chamber 26 containing the sample will determine the volume of the sample chamber and thus effect any calculations of concentration of particles or soluble chemical entities. Also it is important to meet these tolerances so that all particles lying on the bottom of the hollow well 26 containing the sample will be in the focal plane of the objective.

The spacer 32 separates upper optical surface 30 and lower optical surface 33 by 50 microns up to 10 mm, depending on the application. The spacer may be a separate material (e.g. double stick adhesive tape) or may be a molded feature of either the upper optical surface 30 or the lower optical surface 33. The spacer 32, upper optical surface 30 and lower optical surface 33 are bonded together so that fluid does not leak from the sample well 29. In either case the spacer should be of constant thickness preferably ensuring that the height of the sample well is +/−5 microns or some tolerance that insures reliable volume determinations appropriate for a given application.

Figure 5:
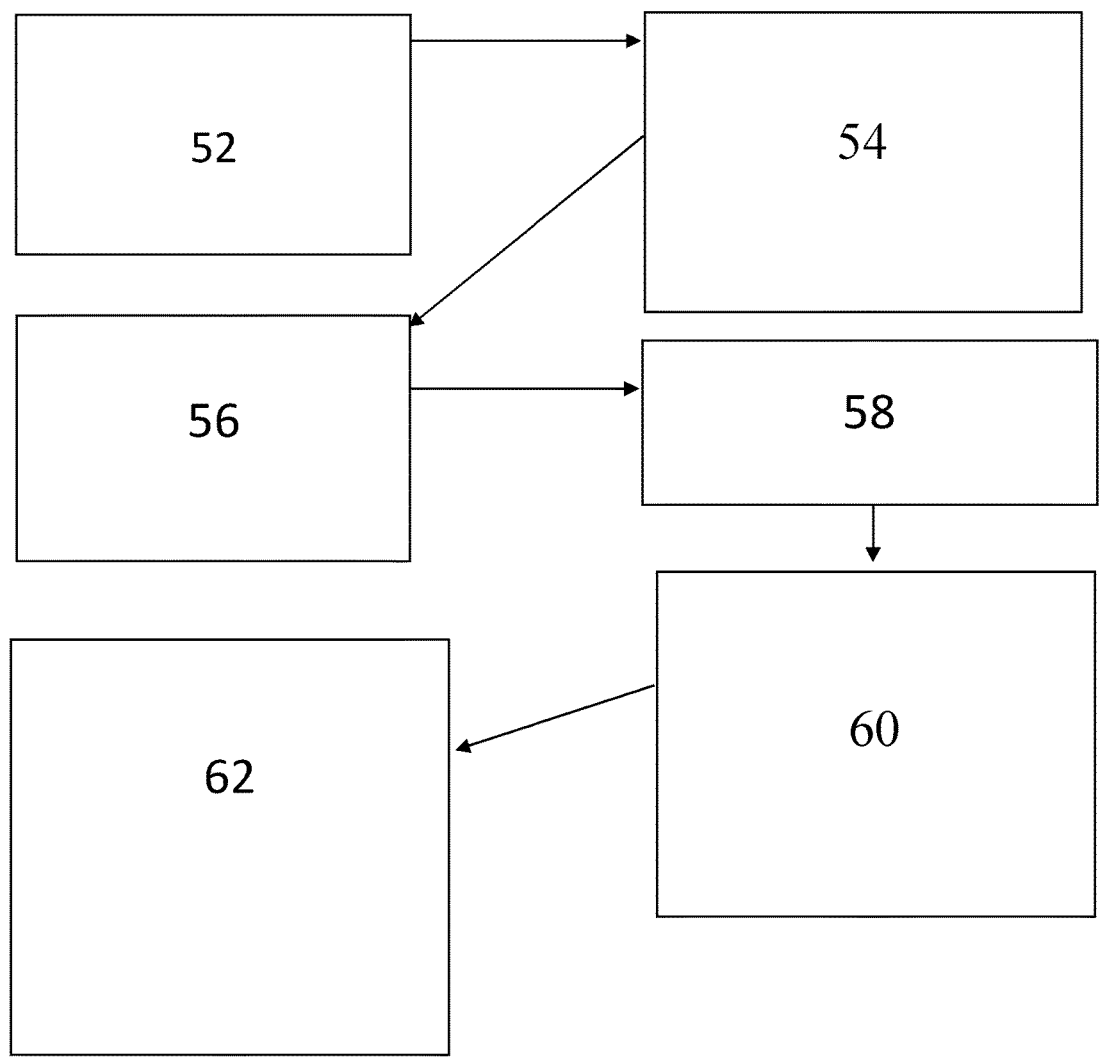
FIG. 5 illustrates exemplary steps of software application on the computer and firmware application on microscopic measuring apparatus and how the software and firmware applications coordinate processing.

FIG. 5 is one possible embodiment of a software application on a computer 10 ("User Interface Computer Application" on the left side of FIG. 5) and firmware application ("Microscope Apparatus Firmware" on the right side of FIG. 5) on the microscopic apparatus 12. The arrows indicate communication that would occur between the computer 10 and the microscopic apparatus 12 in processing a sample.

User Interface Computer Application comprises the steps 52 of:
Operator Selects an option to Begin Processing a Sample
Begin Processing Signal Sent from Computer to Microscope
This signal includes information about the type of sample to be processed.
The Microscope Apparatus Firmware proceeds to 54 of:
Power switched on
Dark current adjusted
LED intensity adjusted
Ready to Process signal to computer
Sample specific information stored in microscope used to determine type and duration or irradiation
The user interface computer application proceeds to 56:
User prompted to insert sample chamber
User confirms that sample chamber inserted and signal sent to microscope to start timer
The Microscope Apparatus Firmware proceeds to 58 of:
Timer started and processing begins after a predetermined elapsed time,
Optional motors or pumps are activated as required.
The Microscope Apparatus Firmware proceeds to 60 of:
Sample chamber sequentially irradiated by each electromagnetic irradiation appropriate for the sample
Digital image captured after each irradiation identified with the type of irradiation used to create the image
Images transferred to the computer for image processing.
The user interface computer application proceeds to 62:
Application performs image processing to determine Identity, Number, Dimensions and Irradiation Intensities of Particles in the field of view and/or in the entire field of view
Application performs calculations to determine concentrations Results stored in memory and displayed to the user for review Results optionally transmitted to remote sites via Internet FIG. 6 describes steps an operator might take in one embodiment of this invention to introduce a body fluid sample into the microscopic apparatus 12. This example illustrates a whole blood sample used to determine reticulocytes. To obtain whole blood, the operator first sticks a finger with a lancet and uses an accurate pipetting device to measure 5 to 50 uL of whole blood into a container with 500 uL to 5000 uL of reagent and mixes the whole blood with the reagent by inverting the container three or more times or by gently aspirating and dispensing the mixture three or more times. The operator transfers the mixture into the sample chamber and inserts the sample chamber into the microscopic device.

Figure 7:
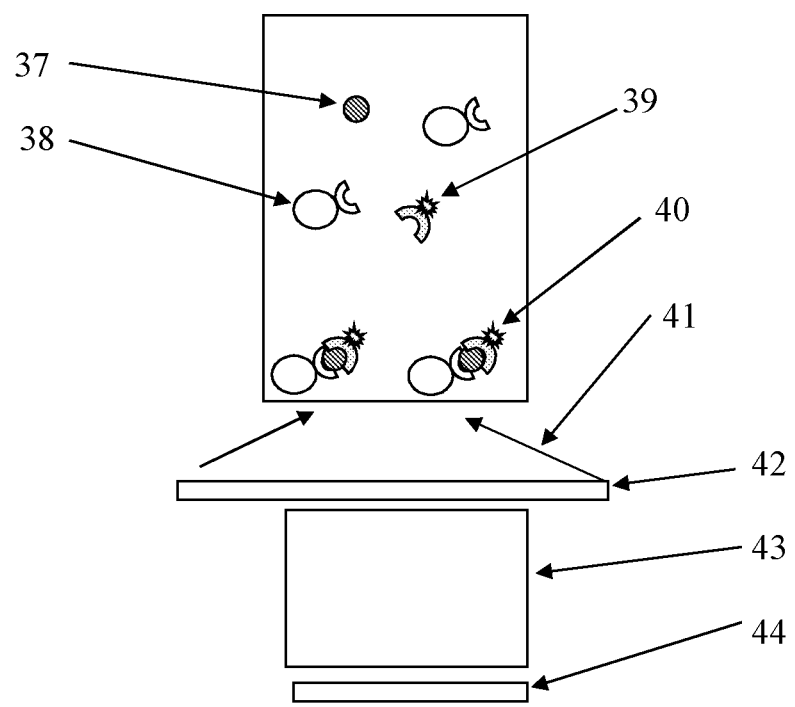
FIG. 7 illustrates immunoassay application using this invention.

FIG. 7 represents an immunoassay applications based on the invention. A body fluid containing a large molecule 37 in this example is mixed with a reagent that contains an antibody represented by a white crescent attached to a particle 38. The antibody attached to the large particle can sediment in aqueous solution but is dispersible in aqueous solution. The antibody attached to the large particle binds to a first site on the large molecule 37. The reagent also contains a second antibody represented by a shaded half crescent with a star 39. The star represents a label. In this example the label is a molecule covalently bound to the antibody that fluoresces when illuminated with a wavelength of light that causes the label to fluoresce.

When the reagent is mixed with a body fluid and placed in a sample chamber as depicted in FIG. 7, large molecule 37 binds to the antibody attached to a particle 38 and the second antibody with a fluorescent label 39 binds to the large molecule 37 bound to antibody attached to a particle 38 to form a complex of particle-antibody-large molecule-labeled antibody. These complexes sediment to the bottom of the sample chamber and come into the focal plane of and objective lens 43 that magnifies the particle complexes onto an image sensor 44. The sample chamber is made of optically clear material that transmits light of the appropriate frequency.

Particles at the bottom of the sample chamber are illuminated by a wavelength of light that excites the fluorescent label attached to the particle. A ring of LEDs 42 between the bottom surface of the sample illuminate the bottom surface of the sample chamber and the particle bound label. Ideally, these LEDs should illuminate the particles at a very low angle so that unbound (i.e. unreacted) labeled antibody 39 is likely to fluoresce when the sample is excited.

In this type of immunoassay scheme, the amount of label bound to particles will increase with increasing quantities of the large molecule 37 in the sample. A standard curve can be constructed to represent the relationship between observed label intensity and the concentration of the molecule.

Typically, this type of immunoassay requires separation of the unbound label 39 large molecule 37 binds to the antibody attached to a particle 38 from the particle bound label 40 to make the assay accurate.

In the immunoassay scheme of FIG. 7, separation occurs when the particle bound label sediments to the bottom of the chamber. By imaging particles in the focal plane of the microscopic detector as disclosed in this invention, only label in a restricted zone of the sample chamber will be detected. By increasing the height of the sample chamber, the degree of separation can be increased and the background fluorescence decreased.

In addition, particles without label will sediment to the bottom of the sample chamber but will not completely cover the chamber. There will be space between the particle and light may penetrate up into the solution and excite labels that are not particle bound. The fluorescence will cause non-specific background fluorescence that will degrade the sensitivity of the assay.

This non-specific background fluorescence from label not bound to particles can in part be eliminated by first identifying particles in the focal plane using a first light source (for example, a light source that causes scattering), using this first illumination to identify the particle boundary and then determining the fluorescent intensity emitted from within each particle boundary by a second fluorophore exciting light source. Further, fluorescent signal outside the particle boundary can be used to determine non-specific fluorescence that can be subtracted from the particle bound fluorescence to increase the accuracy of the assay.

A similar approach can be used for competitive immunoassays except that a particle bound antibody specific for a small molecule competes for a labeled small molecule. The amount of particle bound label that sediments to the bottom of the sample chamber is related to small molecule concentration in the sample.

The foregoing description and FIG. 7 should not limit the scope of this invention to just immunoassays. The white crescent attached to a particle 38 in FIG. 7 could by any molecule of biological or chemical origin that binds to a soluble chemical entity of biological or chemical origin. For example, it could be a hormone receptor that binds to thyroid hormone. It could be a nucleic acid that binds to a soluble nucleic acid. It could be a molecule like avidin that binds to soluble biotin. It could also be a synthesized chimeric entity that binds a soluble chemical or biologic entity.

In the same way the crescent shaped binding partner with a label 39 in FIG. 7 could be a labeled antibody but it could also be a labeled hormone receptor, a nucleic acid or any biological or chemical entity that can be labeled and bind to a soluble entity in solution.

Immunoassays are one example of the detection of soluble chemical entities (including chemicals of biological origin) that can be detected with this invention. Since these immunoassay are based on the concept of detecting specific irradiation signals bound to particles, the following exemplary embodiments also illustrate how immunoassays work.

Example 1

One embodiment of this invention was used to determine reticulocytes in whole blood.

A 5 uL finger stick of whole blood was combined with 5000 uL of a reagent. The reagent contains 63 ug/mL (0.19 mM) of lauramidopropylbetaine, 20 mM sodium bicarbonate, 5 mM EDTA tetrasodium dehydrate, and 96 mM sodium chloride. The final pH was adjusted to 8.1; the final osmolality to 272 mOsm with NaCl or water if necessary. This reagent was filtered through a 0.2 micron filter and stored at room temperature for up to two months without noticeable deterioration or loss of the ability to sphere cells.

The microscopic apparatus contains elements described in FIG. 3 except that it was an upright instead of an inverted microscope. The objective lens 19 is a 10× objective from Nikon Instruments (CFI LU Plan Fluor BD 10×). For transmission microscopy, the irradiation source 15 was a Nikon halogen lamp with a 410 nm filter placed in the illumination path. Samples were irradiated for 80 milliseconds and the bits were set to 235.

For fluorescence, samples were illuminated with a Nikon mercury lamp (Nikon Instruments, X-Cite 120XI Fluor System) for 2000 msec. This could have been replaced with a Phillips Rebel Lumiled (Blue (470 nm) Luxeon Rebel LED—70 lm @ 700 mA) LED. These light sources were positioned below the right angle mirror 20 in FIG. 3. This illumination scheme was used in place of the sub stage irradiation source 18 in FIG. 3.

The right angle mirror 20 in FIG. 3 was replaced with a FITC filter cube (Semrock Corporation, FITC-3540B). This filter cube contains a beam splitter that passes light from the fluorescent illuminations source through a filter that permits only a narrow band of blue light to pass through the objective lens 19 to the sample chamber 16. The Semrock filter cube also contains a filter that serves the same purpose as the irradiation filter 27 in FIG. 3.

The sensor 26 in FIG. 3 was a 5 MP CMOS camera and image capture software (Pixelink Corporation, Ottawa, Canada). A 0.5× relay lens [Edmund Optics, NT58-376 0.5× video microscope coupler) between the 10× objective lens and the camera provided an overall magnification of 5.1× at the sensor of the camera. The relay lens could be removed in a final version of this system by optimizing the distance between the objective and the sensor.

Diluted samples were introduced into a commercially available microscopic sample chamber (product number 81121 from ibidi.com Ibidi, Germany) similar in design to that described in FIG. 4. The chamber is 100 micron high, 5 mm wide and 50 mm long (volume 25 uL).

This configuration was used to demonstrate the principles of this invention because it could be quickly assembled with readily commercial components. It did require removing the filter equivalent to irradiation filter 27 in FIG. 3 to illuminate samples with transmitted light. This manual intervention would not be necessary in a final prototype as illustrated in FIG. 3.

410 nm wavelength transmission images and fluorescent images were captured for each sample. The images were processed using ImageJ open source software from the National Institute of Health (ImageJ). A special plug-in was written (Reticulocyte Plugin for ImageJ) that (1) counted the number of particles observed in transmission or fluorescent images based on user defined size and intensity thresholds, (2) calculated MCH and MCV for each particle transmission particle and (3) identified reticulocytes as fluorescent particles of user defined intensity and size. The coordinates of each transmission and fluorescent particle was determined and used to identify red blood cells in the transmission image that corresponded to particles that fluoresce.

Figure 8:
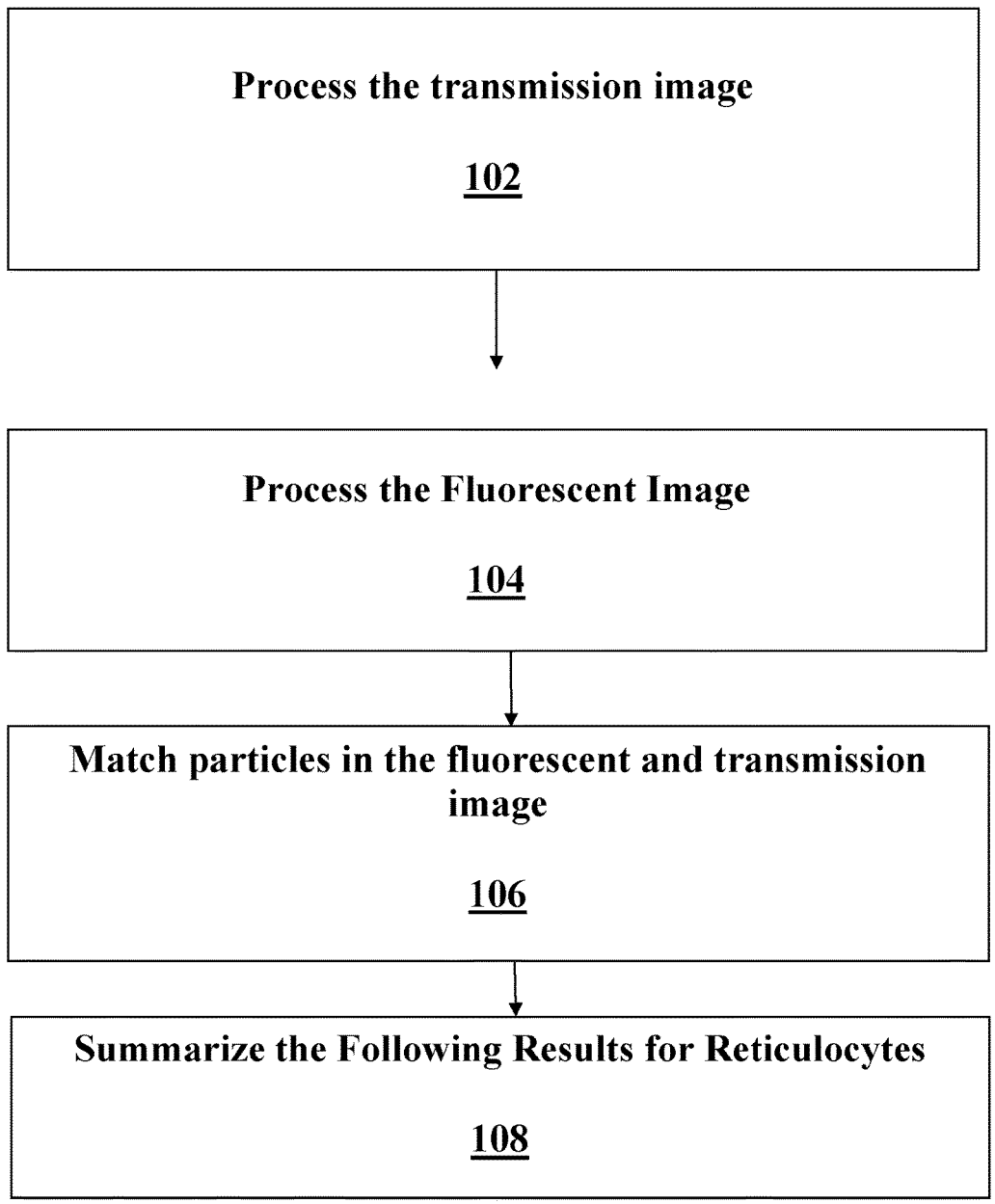
FIG. 8 illustrates image processing steps for a reticulocyte application.

FIG. 8 summarizes an example of steps used by the image software, here the ImageJ plugin to identify and classify reticulocytes and red blood cells. For this application particle thresholds were set for minimum diameter of particles as 20 pixels and a maximum diameter of 80 pixels. For objects in fluorescent and transmission images to be "matched" they had to be separated by no more than 70 pixels. Intensity thresholds for objects in fluorescent images had a minimum intensity threshold of 40 and a maximum threshold of 255.

The first (transmission) image is processed 102 followed by processing 104 of the second (fluorescent) image. Subsequently, the particles in the first and second images are matched 106 and the results for reticulocytes are summarized 108.

Processing 102 the first image comprises one or more of the steps to:
1. Make background intensity across the image uniform,
2. Subtract background and set background to 255
3. Make the image binary using standard ImageJ functions,
4. Apply ImageJ water shedding to separate particles that may be touching,
5. Determine particle count after water shedding and correct particle,
6. Report the corrected particles count if water shedding only increases particle count <5%; if >5% dilute the sample and repeat,
7. Use ImageJ to determine particle count, particle coordinates, diameter and average intensity based on limits of intensity and size determined during development of the final product, and
8. Save the results for all particles in the transmission image.

Processing 104 the second (fluorescent) image comprises one or more of the steps to:
1. Make background intensity across the image uniform,
2. Subtract background,
3. Set white level to 255,
4. Make image binary using standard ImageJ functions,
5. Apply ImageJ water shedding to separate particles that may be touching,
6. Determine particle count after water shedding and correct particle count,
7. If the increase in particle count <5% after water shedding, the count is considered accurate; if >5% the sample must be diluted and re-run,
8. Use ImageJ to determine particle count, coordinates, diameter and average intensity based on limits of intensity and size, and
9. Save the results for all particles in the fluorescent image.

Matching 106 particles in the first and second image comprises one or more of the steps to:
1. Compare coordinates of particles in transmission and fluorescent images,
2. If coordinates of particle and in transmission and fluorescent image are less than a number determined during development as acceptable, a particle in the transmission image is classified as a reticulocyte, and
3. Record distance between matched particles in the transmission and fluorescent images.

Summarizing 108 the results for reticulocytes (that is, for transmission particles that have a corresponding fluorescent image above a predetermined size and intensity) comprises one or more of the following:
1. Transmission intensity,
2. Average Number of Pixels per particle,
3. Average Particle Diameter,
4. A computed erythrocyte volume, and/or
5. A computed hemoglobin concentration.

Table 1 shows precision data or characteristics of the invention.

TABLE 1

| Parameter | RBC | MCH | MCV |
|---|---|---|---|
| Units | Million per uL | pg | fL |
| Total Days | 11 | 11 | 11 |
| Runs per Day | 1 | 1 | 1 |
| Replicates per Run | 2 | 2 | 2 |
| Within Run CV | 7.4% | 2.6% | 2.3% |
| Between Day CV | 2.1% | 2.0% | 1.4% |
| Total CV | 7.7% | 3.3% | 2.7% |

Table 2 shows method comparison of the present invention to a Sysmex Hematology Analyzer.

TABLE 2

| Parameter | RBC | MCH | MCV | % reticulocytes | MCHr |
|---|---|---|---|---|---|
| Units | million per uL | pg | fL | % | pg |
| Number of Samples | 30 | 30 | 30 | 30 | 30 |
| Correlation Coefficient | 0.88 | 0.81 | 0.91 | 0.76 | 0.62 |
| Slope | 1.01 | 0.76 | 1.03 | 0.91 | 1.04 |
| Intercept | −0.03 | 8.0 | −1.9 | −0.1 | −0.5 |
| Standard Error of Estimate | 0.3 | 1.3 | 2.4 | 0.3 | 1.9 |
| Allowable Total Error | 0.6 | 4 | 5 | 0.8 | 4 |
| Microscopic mean +/− SD | 4.6 +/− 0.6 | 31 +/− 2 | 88 +/− 6 | 1.0 +/− 0.4 | 34 +/− 2 |
| Sysmex mean +/− SD | 4.6 +/− 0.6 | 30 +/− 2.5 | 88 +/− 6 | 1.3 +/− 0.4 | 33 +/− 2 |
| Microscopic Range | 3.7 o 6.1 | 24 to 35 | 71 to 99 | 0.5 to 1.9 | 29 to 38 |
| Sysmex Range | 3.7 to 6.0 | 20 to 35 | 68 to 97 | 0.6 to 2.2 | 28 to 37 |
| Pass/Fail | PASS | PASS | PASS | PASS | FAIL |
| samples > allowable error | 1 | 0 | 1 | 0 | 2 | where
RBC concentration: red blood cells/uL
MCH: mean corpuscular hemoglobin content in pg
MCV: mean corpuscular volume (of red blood cell) in fL
MCHr: mean corpuscular hemoglobin content of reticuloctes in pg. MCHr is primarily a measure of optical density with some contribution by light scattering and may have a minor contribution from cellular volume.
CHr: reticulocyte hemoglobin content. Bayer uses this abbreviation for Advia 120 reticulocyte hemoglobin content. This should be roughly equivalent to MCHr. CHr is a light scattering measurement
RET HE: reticuloycte hemoglobin. Sysmex uses this abbreviation for the Sysmex XE-2100 determination of reticulocyte hemoglobin content. RET HE should be roughly equivalent to MCHr and CHr. RET HE is a measure of forward light scatter. Cell volume and hemoglobin content affect this value. The affect of cellular volume is more pronounced with this parameter.

Example 2

A second embodiment of this invention was used to determine granulocytes in whole blood.

Figure 6:
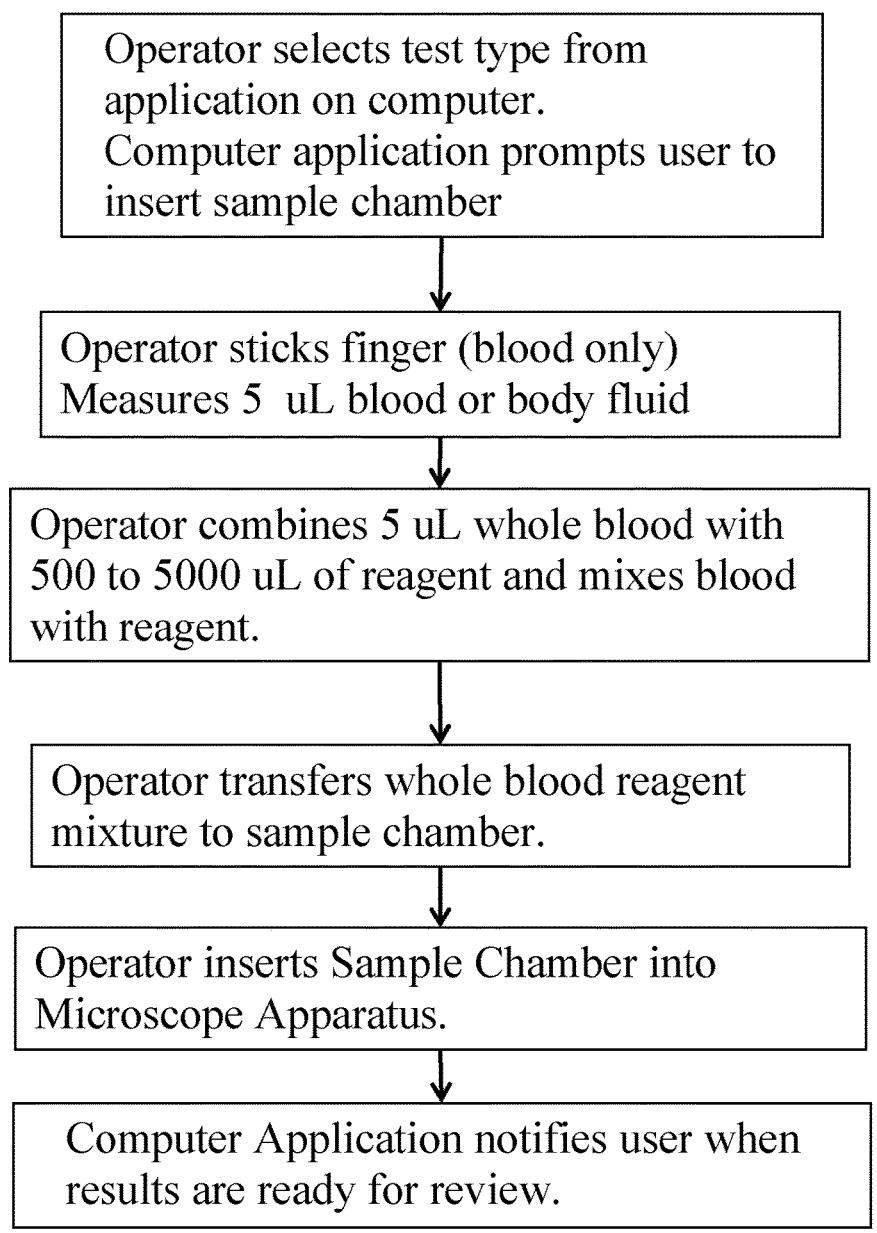
FIG. 6 illustrates steps that an operator may perform to process a blood sample.

In this embodiment many of the manual sample and reagent operator steps summarized in FIG. 6 were automated by using a special cartridge that contains a sample chamber. Whole blood was collected in an EDTA vacutainer and inserted into this cartridge. Fluid circuits in the cartridge automatically moved whole blood from the vacutainer into circuits that accurately segmented 100 uL of whole blood. The device flushed the segment containing the whole blood with 10 mL of reagent into a mixing chamber.

The reagent contained 535 mgm of ammonium chloride, 84 mgm of sodium bicarbonate, 38 mgm of EDTA, 10 mgm of sodium azide, 1 mgm of acridine orange and 100 mL of distilled water. Acridine orange is a nucleic acid binding dye that fluoresces only when bound to nucleic acids either in the nucleus of a cell or in the cytoplasm. It also can bind to some complex carbohydrates in the cytoplasm. This reagent lyses red blood cells permitting an easier detection of white blood cells. It preserves much of the morphology of white blood cells required to detect, classify and enumerate them correctly.

The reagent whole blood mixture was mixed using a ⅛ inch diameter stainless steel ball bearing rotated by a magnet attached to a motor beneath the cartridge. After mixing the reagent, the whole blood mixture was automatically transferred to the sample chamber in the cartridge and optical images collected. Fluids were pushed through channels using air pressure. This invention may optionally include these steps into a sample chamber.

The microscopic apparatus contains elements described in FIG. 3. This early prototype was an inverted microscope.

The objective lens 19 is a 10× objective from Nikon Instruments (CFI LU Plan Fluor BD 10×). For transmission microscopy, the irradiation source 15 was a red LED with a peak emission wavelength of approximately 640 and 680 nm.

For fluorescence, samples were illuminated with a ring of alternating red and blue LEDs. The configuration was identical to the sub stage irradiation source 18 in FIG. 3. The blue LEDs had peak wavelength emission between 450 nm and 500 nm and the red LEDs peak emission between 640 and 680 nm. There were 6 blue and 6 red LEDs in the ring. They were positioned to illuminate the sample chamber 16 in FIG. 5 from an angle between 10 degrees and 45 degrees below the horizontal plane of the sample chamber 16. The purpose of positioning the LEDs in this way was to place the illumination sources as close to 90 degrees from the axis of the objective lens as possible. In this position light scattered close to a right angle can be captured by the objective lens. Granulocytes scatter light intensely at right angles while monocytes and lymphocytes do not so right angle scattered light can be used to classify the granulocytes.

The device had a right angle mirror 20 as in FIG. 3.

The sensor 26 in FIG. 3 was a 0.5 MP CCD camera. The camera was placed at a distance from the objective to achieve between a 5× and a 10× magnification of objects on the sensor.

The image capture software was proprietary but performed similar image processing steps to that of ImageJ software with the plug in that matched transmission and fluorescent images described in FIG. 8. However, in this case the first digital image is a fluorescent image and the second digital image is an image from right angle scattered light.

This method had a correlation coefficient of 0.86 in a method comparison of granulocyte count in 15 samples using this method and results from a Coulter counter used in a hospital laboratory. The slope of the regression line was 0.98 and the intercept of the regression line was 0.0.

Also disclosed are methods and apparatus according to any of the following embodiments:

Embodiment 1

A microscopic method of classifying two dimensional objects within a field of view by,
a) irradiating the objects within the field of view with a first electromagnetic radiation source,
b) projecting the resulting image onto a CMOS or CCD sensor,
c) using the resulting digital representation of the objects within the field of view to identify particles as objects within the digital representation, e.g. by using image software such as ImageJ software,
d) using the coordinates of the edges of each object to define the area contained within the digital representation of the objects to circumscribe the area of each object,
e) determining the area, diameter and average intensity of the digital representations of each object,
f) optionally separating particles that are touching by subtracting one pixel from the border for the digital representation of the object so that touching particles can be identified, enumerated and properly classified,
g) using the edge coordinates to define an area adjacent to the edge of the object but outside of the object to calculate a background intensity of the electromagnetic source and subtracting this average background intensity from the electromagnetic intensity of the object contained within the edges of digital representations of each object,
h) using the electromagnetic intensity of the area within the edges of the object to determine the concentration of the chemical entity within the object that absorbs light by reference to a standard curve,
i) interrogating the same first objects sequentially with as many electromagnetic sources as required to provide unique optical information about the objects within the predetermined boundary of the digital representation of the objects as required to further classify the first set of objects into subsets, and
j) interrogating the same field of view with n additional first electromagnetic radiation sources, each electromagnetic source differentiated by some electromagnetic property that uniquely distinguishes objects within the field of view based on electromagnetic properties of the objects and then exposing the objects with as many additional electromagnetic radiation sources to sub classify objects contained within borders identified by first irradiation sources.

Embodiment 2

The method of embodiment 1 in which the electromagnetic sources are light of wavelengths from 100 nm to 2000 nm which include portions of the ultraviolet, visible and infrared spectrum.

Embodiment 3

The method of any of embodiments 1-2 in which the electromagnetic sources are light from 100 nm to 1000 nm that cause fluorescent excitation of naturally occurring fluorophores or artificially introduced fluorophores, the light emitted by the excited fluorophores being used to create images that aid in classifying the corresponding object.

Embodiment 4

The method of any of embodiments 1-3 in which the electromagnetic sources are light from 100 nm to 2000 nm that is absorbed by chemical entities within the object so that the corresponding image containing the absorbing entities has a lower intensity of detected electromagnetic radiation.

Embodiment 5

The method of any of embodiments 1-4 using electromagnetic sources that intersect the sample at different angles to cause different intensity of electromagnetic radiation scattering of objects within the field of view.

Embodiment 6

The method of any of embodiments 1-5 using electromagnetic sources that intersect objects within the field of view from 0 to 80 degrees normal to the detecting sensor area so that the objective lens of the microscope captures light scattered at different angles.

Embodiment 7

The method of any of embodiments 1-6 using electromagnetic sources with different polarization properties.

Embodiment 8

The method of any of embodiments 1-7 using electromagnetic sources that induce phosphorescence of naturally occurring phosphors or artificially introduced phosphors.

Embodiment 9

The method of any of embodiments 1-8, using transmitted light source from the Soret band of hemoglobin to create images of erythrocytes from animal or human blood and using these images to calculate the area, the diameter and the volume of the erythrocyte and the concentration of hemoglobin within the erythrocytes and where reticulocytes are identified among all of the erythrocytes by exciting a nucleic acid binding fluorophore attached to the reticulin in reticulocytes and identifying those erythrocytes that have fluorescent emissions.

Embodiment 10

The method of any of embodiments 1-9, in which leukocytes from animal or human blood treated with fluorophores are detected by using an excitation light source and the emitted light is projected onto a detection sensor to form digital representations of the fluorescing leukocytes.

Embodiment 11

The method of embodiment 10 in which the detection of leukocytes from animal or human blood uses nucleic acid bound fluorophores.

Embodiment 12

A method of embodiment 11 in which the nucleic acid bound fluorphores such as but not limited to acridinium esters or thiazole orange or ethidium bromide.

Embodiment 13

The method of any of embodiments 10-12, in which the diameter, concentration of the fluorescently emitting entity and the volume of the object corresponding to the two dimensional fluorescent image has been calculated and used to aid classifying the leukocytes into lymphocytes, granulocytes and monocytes.

Embodiment 14

The method of any of embodiments 10-13, in which two or more fluorescent excitation sources or two or more fluorescent emission detection wavelengths are used to detect different fluorescing species so that different entities within a leukocyte can be detected and the intensity and the amount of fluorescence is used to further classify subsets of leukocytes.

Embodiment 15

The method according to any of embodiments 1-14 and using visible light from 300 nm to 800 nm that illuminates granulocytes at angles between 60 and 90 degrees normal to the sensor so that cytoplasmic granules in white cells intensely scattered light while cytoplasm without granules scatter no light or scatter light of very low intensity.

Embodiment 16

Granulocytes among these images sub classified by illuminating the same objects with 300 to 800 nm light at angles of 60 to 90 degrees normal to the sensor, granulocytes being those images with a high intensity of scattered light while.

Embodiment 17

The method of any of embodiments 1-16, in which leukocytes from human or animal blood are identified first using fluorescence and then identifying lymphocytes and monocytes as the images with negligible scattered light.

Embodiment 18

The method of any of embodiments 1-17, and using a 1 to 50 megapixel CMOS or CCD sensor.

Embodiment 19

The method of any of embodiments 1-18 in which the electromagnetic sources can be switched on and off with electronic switches providing the ability of interrogating the same field of view sequentially with 2-10 different electromagnetic sources limited only by constraints of space for the electromagnetic sources and constraints in time for imaging the field of view.

Embodiment 20

The method of any of embodiments 1-19 and having a disposable or reusable viewing chamber that contains a liquid dispersion of particles of interest and permits a statistically significant number of particles to be counted

Embodiment 21

The method of embodiment 20, wherein the viewing chamber being between 50 microns and 10 mm in thickness.

Embodiment 22

The method of embodiment 18 and wherein an objective lens is placed between a detecting CMOS or CCD sensor that provides sufficient magnification to determine object dimensions and yet has a sufficient field of view to permit statistically significant counting of objects in the field of view.

Embodiment 23

The method of embodiment 22, wherein the objective lens is between 2× and 15× magnification.

Embodiment 24

The method of any of embodiments 1-23 that detects both erythrocytes and leukocytes in body fluids without separation or lysis of the red cells using the Soret band of erythrocytes to identify erythrocytes and the fluorescence of nucleic acid bound fluorophores to detect leukocytes.

Embodiment 25

The method of any of embodiments 1-23 using a sphering reagent such as but not limited to N-Dodecyl-N,N-dimethyl-3-ammonio-1-propanesulfonate to convert erythrocytes from biconcave discs to uniform spheres and does not affect the morphology or scattering properties of leukocytes.

Embodiment 26

The method of embodiment 25 that does not use a reagent that spheres but uses a reagent that maintains the native biconcave disc shape of the erythrocytes.

Embodiment 27

The method of any of embodiments 1-23 that selectively lyses red cells within 30 seconds to 10 minutes without affecting the morphology or light scattering properties of leukocytes.

Embodiment 28

The method of any of embodiments 26-27 that uses 0.1 M ammonium chloride, pH 8.0 as the red cell lysing reagent with or without sphering reagents.

Embodiment 29

A microscopic measuring apparatus consisting of a CMOS sensor, an objective lens, optional optical filters to modify light properties of irradiating, emitting or scattered radiation, optional mirrors or beam splitters to direct transmitted, scattered electromagnetic radiation and emitted electromagnetic radiation, electromagnetic radiation means that can be switched on and off, as wired or wireless communication with a separate computer that contains imaging software that identifies and classifies objects in images collected from the CMOS sensor in the microscopic apparatus, control software for operating the microscope.

Embodiment 30

The measuring apparatus of embodiment 29 having an independent power supply or connectable to an external electrical power supply.

Embodiment 31

The measuring apparatus of any of embodiments 29-30 and used to detect particles or high or low molecular weight chemical entities in body fluids, including but not limited to, blood, urine, spinal fluids, saliva, peritoneal fluids and lung lavages and providing a complete range of in vitro diagnostic tests using a single detection measuring apparatus.

Embodiment 32

The measuring apparatus of any of embodiments 29-31 that performs hematology, urinalysis, chemistry, immunoassay and/or coagulation in vitro diagnostic tests.

Embodiment 33

The measuring apparatus of any of embodiments 29-32 that uses mirrors and/or beam splitters to redirect the light from an objective lens from a vertical plane to a horizontal plan so that the height of the camera is between 2 cm and 15 cm.

Embodiment 34

The measuring apparatus according to any of embodiments 29-33 that provides front surface epi-illumination by means of a light ring or similar illumination means placed below the microscopic stage.

Embodiment 35

The measuring apparatus according to any of embodiments 29-34 that provides front surface epi-illumination through the objective lens.

Embodiment 36

The measuring apparatus of any of embodiments 29-35 that has the capability of performing fluorescent microscopy.

Embodiment 37

The measuring apparatus of any of embodiments 29-36 that can perform transmission microscopy.

Embodiment 38

The measuring apparatus of any of embodiments 29-37 that can perform light scattering microscopy.

Embodiment 39

The measuring apparatus of any of embodiments 29-38 that can sequentially perform transmission, light scattering and/or fluorescence microscopy on the same set of objects by sequentially illuminating the objects in the viewing field with different illumination sources.

Embodiment 40

The measuring apparatus of embodiment 39 that can provide illumination between 0 and 60 degrees perpendicular to the path of scattered light path through the objective.

Embodiment 41

The measuring apparatus of any of embodiments 39-40 that provides illumination from 60 to 80 degrees perpendicular to the path of scattered light path through the objective.

Embodiment 42

The measuring apparatus of embodiment 37 that illuminates a sample with transmitted light using one or multiple LEDs with the sample positioned between the LEDs and the microscope objective.

Embodiment 43

The measuring apparatus of embodiment 37 that controls the illumination time of a fluorescent excitation source between 20 milliseconds and 10 seconds to achieve sufficient fluorescent emission intensity for the CMOS sensor to detect objects of interest with fluorescent emissions.

Embodiment 44

The measuring apparatus of embodiment 37 that controls the illumination time of LEDS placed from 0 to 80 degrees perpendicular to the path of scattered light path through the objective between 20 milliseconds and 10 seconds to achieve sufficient light scattering to detect objects of interest.

Embodiment 45

The measuring apparatus of any of embodiments 29-44 that has a stage for holding a sample chamber positioned in front of the objective lens while illuminated by the light sources, the stage can either be fixed or moveable.

Embodiment 46

The measuring apparatus of embodiment 45, wherein the stage permits one to ten viewing areas to be viewed through the objective in the sample chamber, the stage being moved either manually or under motor control.

Embodiment 47

The measuring apparatus of any of embodiments 45-46, wherein the stage holds the sample chamber a fixed distance (+/−10 microns) between the face of the CMOS sensor and the surface on which objects are resting thus obviating the need for focusing before taking images.

Embodiment 48

The measuring apparatus of any of embodiments 45-47, wherein the moveable stage contains a fixed reference area that permits the microscope to adjust illumination intensity of the light sources, verify ranges of intensity used to aid in classifying objects in a sample and which permits quality control of magnification and focus of the microscope without operator intervention.

Embodiment 49

The measuring apparatus of any of embodiments 45-48, wherein the moveable stage interrupts sensors that the measuring apparatus uses to detect the movement from one field of view to another in the sample chamber triggering illuminations means and the CMOS sensor to capture images so that no operator intervention is required to capture multiple images.

Embodiment 50

The measuring apparatus of any of embodiments 45-49, wherein the moveable stage contains sensors that sense the movement from one field of view to another in the sample chamber using this capability to determine the time when the sample chamber is introduced into the microscope and then begin to capture images from fields of view in the sample chamber at fixed intervals between 10 seconds and ten minutes after the introduction of the sample chamber into the measuring apparatus.

Embodiment 51

The sample chamber for the microscopic measuring apparatus of claim 29 that contains a sample held between two flat surfaces separated by 5 and 50 microns and contains between 5 and 100 uL of fluid, the shape of the chamber permitting uniform and reproducible filling of the chamber with sample and preventing movement of the sample or evaporation of sample prior to completing analysis.

Embodiment 52

The sample chamber of embodiment 51 that also has a chamber used to combine a sample with a reagent.

Embodiment 53

The sample chamber of any of embodiments 51-52 that has the means of accurately measuring 5-50 uL of sample and 50 to 500 uL of reagent and then combining and mixing the sample with the reagent prior to introducing the sample into an observation area of the sample chamber.

Embodiment 54

The sample chamber according to any of embodiments 51-53 that has two flat surfaces that are between 100 microns and 4 mm in thickness, the thickness and composition of the surfaces selected to minimize spectral reflections and light scattering from the surfaces into the chamber that might otherwise contribute to background scattering.

Embodiment 55

The sample chamber according to any of embodiments 51-54 that has a viewing area of 1 mm by 1 mm up to 5 mm by 5 mm and is from 100 microns to 20 mm in height.

Embodiment 56

The sample chamber of any of embodiments 51-55 that permits samples to sediment from 60 seconds up to 24 hours so that particles that sediment come to rest at the bottom of the chamber and can be viewed, identified and classified by the microscopic measuring apparatus of any of embodiments 29-50.

Embodiment 57

The sample chamber of any of embodiments 51-56 that has a means of closing the sample chamber after filling it so that no evaporation occurs during settling time.

Embodiment 58

A method of performing immunoassays using a microscopic measuring apparatus consisting of a CMOS sensor, an objective lens, optional optical filters to modify light properties of irradiating, emitting or scattered radiation, optional mirrors or beam splitters to direct transmitted, scattered electromagnetic radiation and emitted electromagnetic radiation, electromagnetic radiation means that can be switched on and off, and having means for wired or wireless communication with a separate computer that contains imaging software that identifies and classifies objects in images collected from the CMOS sensor in the microscopic apparatus, control software for operating the microscope,
   a) that uses specific antibodies attached to dispersed solid phase particles that sediment in aqueous solution at a rate between 0.1 mm per minute and 2 mm per minute and the antibody on the particle specifically binding analytes in whole blood
   b) that detects the analytes attached to antibody bound solid phase either competitively using a labeled analyte or non-competitively using a labeled capping antibody where the dispersed particles sediment to the bottom of a viewing chamber, the height of the viewing chamber being selected to provide enough concentration of the particles so that a washing step is not required to achieve the desired sensitivity for the assay where the images of the sedimented particles are identified by a first electromagnetic radiation and the boundary or edges of this first image object are determined, and
   c) after exposure to a second electromagnetic radiation, the intensity of electromagnetic radiation lying within the boundary defined by the first electromagnetic radiation is determined, and
   d) after exposure to a second electromagnetic radiation, the intensity of electromagnetic radiation lying outside the boundary defined by the first electromagnetic radiation is determined and subtracted from the intensity of electromagnetic radiation lying within the boundary defined by the first electromagnetic radiation effectively subtracting background electromagnetic radiation whereby the intensity of the second electromagnetic radiation is compared to a standard curve to derive a concentration of the analyte assayed.

Embodiment 59

A method of performing assays of a desired chemical entity using a binding partner for the desired chemical entity attached to a dispersible solid phase objects, a microscopic measuring apparatus consisting of a CMOS sensor, an objective lens, optional optical filters to modify light properties of irradiating, emitting or scattered radiation, optional mirrors or beam splitters to direct transmitted, scattered electromagnetic radiation and emitted electromagnetic radiation, electromagnetic radiation means that can be switched on and off, and having means for wired or wireless communication with a separate computer that contains imaging software that identifies and classifies objects in images collected from the CMOS sensor in the microscopic apparatus, and control software for operating the microscope by the method of classifying two dimensional objects within a field of view by, a) irradiating the objects within the field of view with a first electromagnetic radiation source,
b) projecting the resulting image onto a CMOS or CCD sensor,
c) using the resulting digital representation of the objects within the field of view to identify particles as objects within the digital representation using ImageJ software,
d) using the coordinates of the edges of each object to define the area contained within the digital representation of the objects to circumscribe the area of each object,
e) determining the area, diameter and average intensity of the digital representations of each object,
f) separating particles that are touching by subtracting one pixel from the border for the digital representation of the object so that touching particles can be identified, enumerated and properly classified,
g) using the edge coordinates to define an area adjacent to the edge of the object but outside of the object to calculate a background intensity of the electromagnetic source and subtracting this average background intensity from the electromagnetic intensity of the object contained within the edges of digital representations of each object,
h) using the electromagnetic intensity of the area within the edges of the object to determine the concentration of the chemical entity within the object that absorbs light by reference to a standard curve,
i) interrogating the same first objects sequentially with as many electromagnetic sources as required to provide unique optical information about the objects within the predetermined boundary of the digital representation of the objects as required to further classify the first set of objects into subsets, and
j) interrogating the same field of view with n additional first electromagnetic radiation sources, each electromagnetic source differentiated by some electromagnetic property that uniquely distinguishes objects within the field of view based on electromagnetic properties of the objects and then exposing the objects with as many additional electromagnetic radiation sources to sub classify objects contained within borders identified by first irradiation sources,
k) that uses any binding partner attached to a dispersed solid phase to capture a desired chemical entity in body fluids and detects the desired chemical entity either competitively using a second labeled capture partner of the chemical entity or non-competitively using a labeled derivative of the desired chemical entity
l) where the dispersed particles sediment to the bottom of a viewing chamber, the height of the viewing chamber selected to provide enough concentration of the particles so that a washing step is not required to achieve the desired sensitivity for the assay
m) where the images of the sedimented particles are identified by a first electromagnetic radiation and the boundary or edges of this first image object are determined
n) and after exposure to a second electromagnetic radiation, the intensity of electromagnetic radiation lying within the boundary defined by the first electromagnetic radiation is determined
o) and after exposure to a second electromagnetic radiation, the intensity of electromagnetic radiation lying outside the boundary defined by the first electromagnetic radiation is determined and subtracted from the intensity of electromagnetic radiation lying within the boundary defined by the first electromagnetic radiation is determined
p) The intensity of the second electromagnetic radiation compared to a standard curve to derive a concentration of the assayed nucleic acid.

Embodiment 60

The method of embodiment 59 that uses transmitted LED light specific for the wavelength of the colored product of a colorimetric chemical reaction of interest, the LEDs being turned on or off to achieve the desired wavelength of irradiation.

Embodiment 61

The measuring apparatus of any of embodiments 29-50, wherein the measuring apparatus uses emitted electromagnetic radiation specific for a chemical reaction of interest.

Embodiment 62

The measuring apparatus of any of embodiments 29-50 that uses dry chemistry test strips mounted on a moveable stage to perform chemical analyses, the area of detection determined by calculating the area of the dry reaction pad that provides consistent readings.

The invention claimed is:

1. A microscopic measuring apparatus for body fluid, comprising:
an image sensor, wherein the image sensor is configured to be wired or wirelessly connectable to a separate computer, mobile computer, or a tablet configured to identify and classify objects in images collected from the image sensor in the microscopic apparatus;
an objective lens;
a first electromagnetic radiation source for irradiating a microscopic stage comprising two opposing surface sides; and
a second electromagnetic radiation source for irradiating the microscopic stage, wherein the second electromagnetic radiation source is different from the first electromagnetic radiation source, further wherein the first electromagnetic radiation source, the second electromagnetic radiation source, and the image sensor are positioned at a same surface side of the two opposing surface sides of the microscopic stage,
wherein the microscopic measuring apparatus is configured to sequentially:
irradiate the microscopic stage with the first electromagnetic radiation source to obtain a first digital representation of the body fluid on the microscopic stage;
identify, based on the first digital representation, first objects within the first digital representation;
determine one or more object properties of the first objects;

irradiate the microscopic stage with the second electromagnetic radiation source to obtain a second digital representation of the body fluid on the microscopic stage;

identify, based on the second digital representation, second objects within the second digital representation;

determine one or more object properties of the second objects; and attribute the object properties of the second objects to first objects if coordinates or boundaries of the second objects match coordinates or boundaries of the first objects.

2. The microscopic measuring apparatus according to claim 1, comprising an optical filter assembly including at least one of a first optical filter, a first mirror and a first beam splitter, the first optical filter configured to modify light properties of irradiating, emitting or scattered radiation, the first mirrors and/or the first beam splitter configured to direct scattered electromagnetic radiation and emitted electromagnetic radiation.

3. The microscopic measuring apparatus according to claim 1, wherein the microscopic measuring apparatus is configured to perform one or more of fluorescent microscopy and light scattering microscopy.

4. The microscopic measuring apparatus according to claim 1, comprising a plurality of electromagnetic radiation sources, wherein the microscopic measuring apparatus is configured to sequentially perform at least one of light scattering microscopy and fluorescence microscopy on the same set of objects by sequentially illuminating the objects in the microscopic stage with different electromagnetic radiation sources.

5. The microscopic measuring apparatus according to claim 1, wherein the microscopic measuring apparatus is configured to:

irradiate the microscopic stage with the first electromagnetic radiation source;

project a resulting image onto the image sensor to obtain a first digital representation of the microscopic stage;

identify, based on the first digital representation, first objects within the first digital representation;

define, based on edge coordinates of the edges of the first objects, areas contained within the first digital representation of the first objects to circumscribe the areas of the first objects;

determine one or more object properties of the first objects;

separate particles that are touching by subtracting one or more pixels from the border for the first digital representation of the first objects;

define, based on the edge coordinates, an area adjacent to the edge of a first object but outside of the first object to calculate a background intensity of the first electromagnetic radiation source and subtracting this average background intensity from the electromagnetic intensity of the first object; and determine, based on the electromagnetic intensity of the areas within the edges of the first objects, particle properties within the first objects that absorb light by reference to a standard curve.

6. The microscopic measuring apparatus according to claim 1, wherein the microscopic measuring apparatus is configured to:

interrogate the microscopic stage with the second electromagnetic radiation source to obtain the second digital representation, the second electromagnetic radiation source differentiated from the first electromagnetic radiation source by some electromagnetic property that uniquely distinguishes second objects within the microscopic stage based on electromagnetic properties of the second objects; and expose the second objects with as many additional electromagnetic radiation sources as required to provide unique optical information about the second objects of the second digital representation as required to further classify the second objects into second subsets to sub-classify objects contained within borders identified by first electromagnetic radiation sources.

7. The microscopic measuring apparatus according to claim 6, wherein the first electromagnetic radiation source and the second electromagnetic radiation source intersect the sample at different angles to cause different intensity of electromagnetic radiation scattering of objects within the microscopic stage.

8. The microscopic measuring apparatus according to claim 6, wherein the first electromagnetic radiation source and the second electromagnetic radiation source intersect objects within the field of view from 0 to 80 degrees normal to the detecting sensor area so that the objective lens of the microscopic measuring apparatus captures light scattered at different angles.

9. The microscopic measuring apparatus according to claim 1, wherein the electromagnetic radiation source(s) radiate light of wavelengths selected from the range of 100 nm to 2000 nm, the light including portions of the ultraviolet, visible and infrared spectrum or wherein the electromagnetic radiation source(s) radiate light of wavelengths selected from the range of 100 nm to 1000 nm, the light causing fluorescent excitation of naturally occurring fluorophores or artificially introduced fluorophores, wherein the light emitted by the excited fluorophores being used to create images that aid in classifying the corresponding object, or wherein the electromagnetic source(s) radiate light of wavelengths selected from the range of 100 nm to 2000 nm, wherein light is absorbed by chemical entities or particles within the object so that the corresponding image containing the absorbing entities or particles has a lower intensity of detected electromagnetic radiation.

10. The microscopic measuring apparatus according to claim 1, wherein the electromagnetic radiation source(s) radiate visible light from 300 nm to 800 nm that illuminates granulocytes at angles between 60 and 90 degrees normal to the image sensor so that cytoplasmic granules in white cells intensely scatter light while cytoplasm without granules scatter no light or scatter light of very low intensity.

11. The microscopic measuring apparatus according to claim 10, wherein the microscopic measuring apparatus is configured to classify granulocytes among these images sub classified by illuminating the same objects with 300 to 800 nm light at angles of 60 to 90 degrees normal to the sensor, granulocytes being those images with a high intensity of scattered light.

12. The microscopic measuring apparatus according to 1, wherein the microscopic measuring apparatus is configured to provide illumination between 0 and 60 degrees or from 60 to 80 degrees perpendicular to the path of scattered light path through the objective.

13. The microscopic measuring apparatus according to 1, wherein the microscopic measuring apparatus is configured to control the illumination time of LEDs placed from 0 to 80 degrees perpendicular to the path of scattered light path through the objective between 20 milliseconds and 10 seconds to achieve sufficient light scattering to detect objects of interest.

14. A sample chamber for use with a microscopic measuring apparatus, the sample chamber comprising:
   a spacer;
   two flat surfaces separated by the spacer, wherein the two flat surfaces are separated by 5 and 50 microns for containing a sample,
   an entry port for receiving the sample into the sample chamber; and
   an exit port for relieving air from the sample chamber, the sample chamber being configured to contain between 5 and 100 uL of body fluid, a shape of the sample chamber permitting uniform and reproducible filling of the sample chamber with sample and preventing movement of the sample or evaporation of sample prior to completing analysis.

15. The sample chamber according to claim 14, the sample chamber comprising a chamber used to combine a sample with a reagent, and the sample chamber comprising a device for accurately measuring 5-50 uL of sample and 50 to 500 uL of reagent and then combining and mixing the sample with the reagent prior to introducing the sample into an observation area of the sample chamber.

16. The sample chamber according to claim 14, the sample chamber having a first wall and a second wall with two respective flat surfaces, the first and second walls being between 100 microns and 4 mm in thickness, the thickness and composition of the walls selected to minimize spectral reflections and light scattering from the surfaces into the chamber that might otherwise contribute to background scattering.

* * * * *